United States Patent [19]

Ehling et al.

[11] 3,854,125

[45] Dec. 10, 1974

[54] AUTOMATED DIAGNOSTIC TESTING SYSTEM

[75] Inventors: Ernest H. Ehling, Hackensack; Philip C. Jackson, Oakland; James V. McCarthy, Riverdale, all of N.J.

[73] Assignee: Instrumentation Engineering, Inc., Franklin Lakes, N.J.

[22] Filed: June 15, 1971

[21] Appl. No.: 153,902

[52] U.S. Cl. .......... 340/172.5
[51] Int. Cl. .......... G06f 11/00
[58] Field of Search .......... 340/172.5; 235/157; 324/73 AT

[56] References Cited

UNITED STATES PATENTS

| | | | |
|---|---|---|---|
| 3,213,428 | 10/1965 | Blanchi et al. | 340/172.5 |
| 3,247,498 | 4/1966 | Sadvary et al. | 340/172.5 |
| 3,585,599 | 6/1971 | Hitt et al. | 340/172.5 |
| 3,597,682 | 8/1971 | Hubbs et al. | 324/73 AT |
| 3,623,011 | 11/1971 | Baynard et al. | 340/172.5 |
| 3,629,856 | 12/1971 | Arai et al. | 340/172.5 |
| 3,638,193 | 1/1972 | Opferman | 340/172.5 |
| 3,646,519 | 2/1972 | Wollum et al. | 340/172.5 |
| 3,665,418 | 5/1972 | Bouricius et al. | 340/172.5 |
| 3,681,758 | 8/1972 | Oster et al. | 340/172.5 |

*Primary Examiner*—Gareth D. Shaw
*Assistant Examiner*—Mark Edward Nusbaum
*Attorney, Agent, or Firm*—Morgan, Finnegan, Durham & Pike

[57] ABSTRACT

An automated diagnostic testing system under control of a computer having on-line compiling capability for entering and modifying testing programs involving the inter-connection of the unit under test with one or more peripheral devices.

An important aspect of the invention is the system for routing electrical signals between a selected pair of a plurality of terminals, via one or more conductive buses, including switch means associated with each terminal and controllably operative to connect that terminal to any one of the buses. Switch control means responsive to programmed commands determines from a stored indication the availability of one of the buses, assigns the bus determined to be available to one of the selected terminals, assigns the other selected terminal to that bus, stores an indication of the bus and terminal so assigned and operates the switch means associated with the selected terminals to connect them to the assigned bus. The switch means comprises a controllable individual switch between each bus and a particular terminal, and at least one separately controllable switch for opening and closing the series circuit between the terminal and any bus. This separately controllable switch is operated prior to operating the individual switches between the terminal and each of the buses.

22 Claims, 24 Drawing Figures

AUTOMATED DIAGNOSTIC TESTING SYSTEM

BACKGROUND OF THE INVENTION

This invention relates to automated diagnostic circuit testing systsms, including a novel routing system which has particular application to apparatus under programmable computer control. The system is capable of accepting and executing test programs involving the automatic interconnection of terminals over selected ones of a plurality of assignable connecting circuits.

Although the invention has applicability to a wide variety of routing and switching systems or networks, it is particularly advantageously suited to computerized diagnostic and control systems, such as systems for testing automatically printed circuit boards, "black box" modules, integrated circuits, and the like. A primary aspect of the invention, therefore, concerns improvements in automated diagnostic test equipment and similar apparatus in which selected signals may be routed to any of a number of terminals or test points at which a stimulus is to be applied or at which a measurement is to be taken.

The testing of complex, advanced electrical apparatus, such as digital equipment and special purpose computing control systems, is now generally carried out automatically. Rarely can such testing be accomplished practically or economically by manual methods. Automated testing consists of subjecting the unit under test (UUT) to a predetermined sequence of excitations at preselected pins (terminals) of the unit and measuring the response of the unit to be applied excitation or excitations at other terminals or test points. If the unit under test responds in the predicted way, the test equipment may advance to the next step under the control of a programmed command which tests the unit step-by-step. If the predicted response from the unit is not obtained, then the test equipment may signal a warning or may effect some different operation or step to isolate the particular fault in the unit.

In the most advanced systems now known for testing automatically electronic devices, some form of program device is used to instruct the test equipment to execute the various steps of the test. Usually, this device is in the form of a punched tape reader, magnetic tape reader, or disk file which interrogates the information contained on punched tape, magnetic tape or a revolving disk that is programmed to check the unit being tested. In general, such program operates on the specific test equipment to cause peripheral test devices to be connected to specific UUT pins. The stimulus devices used to excite the UUT are usually permanently wired into the system so that their outputs are available only at predetermined paths in the machine. The human programmer must, then, specify the connection and disconnection of the desired terminals of the unit under test to and from specific terminals (outputs) of the peripheral test devices.

In one known machine, a computer is utilized to control the test equipment to make the required connections between the UUT and stimulus generators and/or digital conversion equipment for measuring responses of the tested system. This test system differs from systems using punched cards and the like, in that the computer memory is utilized to store the test program and the test evaluation procedure. Yet another system relies upon a comparison of data obtained, on the one hand, from a group of programmed cards containing information of the desired test results and, on the other hand, from actual responses of the UUT. Any discrepancy in data produces a no-go condition.

A notable disadvantage of all of the prior art systems is the requirement for a detailed and accurate program which includes each precise connection and disconnection command; that is, since the program is virtually the machine implemented testing process that would be carried out manually, the writer of the program must take extreme care not to effect any misconnections, such as those which would cause short circuits, incorrect measurements, open circuits, etc.

In a more general context, the circuit testing systems of the prior art also lack the capability of compiling both rapidly and within the system, the instructions entered and desired to be immediately performed. In the previous systems compiling is accomplished by an independent compiler. This means that extra time is required to compile by reason of the necessity for forming an intermediate store for the compiled object (machine executable) code, which is difficult to edit and change. Moreover, execution of the test program cannot be carried out substantially simultaneously with the compiling process, so that incorrect instructions can be discovered and changed as the program is run. The versatility of such prior systems accordingly is severely limited because of inconvenience of use and operation.

By and large, known testing apparatus having computer control employ the computer simply to execute the program fed into the computer from the input terminal. This program, as already mentioned, is one which is compiled separately from the formulation and execution of the test steps. Compiling is not carried out there in a manner which allows for immediate analysis of the correctness of the program. Thus the known testing systems cannot provide indications of, for example, an attempt to make an incorrect connection between two terminals.

Generally, the prior art systems also fail to achieve universality because they lack the means and capacity of selecting automatically a circuit path between two terminals or test points in response to a general test or measurement command. For example, although previous automatic test systems have the capability of connecting an instrument to an UUT terminal point in response to a programmed command, each circuit path utilized must be accounted for and no subsequent instruction for another connection to that same path can be safely made before the old connection is broken. Thus, each connection to and from the UUT must be specified precisely.

Even those systems which employ a computer as the primary program source and analytical tool are substantially dedicated to the testing and analysis of particular systems or particular types of systems, because the peripheral devices used to stimulate and measure responses of circuit are essentially permanently wired components which cannot be switched or assigned to circuit paths other than those circuit paths to which they were originally wired.

Because of the "hard-wired" or dedicated nature of the switching or signal routing components of many systems used extensively in industry, adapter units or cables have been employed in order to achieve correct application of the stiumuls and measurement signals to the UUT terminals and test points. A system designed, for example, to produce certain excitation signals at given output terminals requires the use of a suitable interface, such as an adapter cable, in order to route those excitation signals to the correct terminals of the unit under test, unless that unit requires excitation of precisely the same terminals as the unit for which the equipment was designed or initially developed. As a consequence, each unit must be plugged into the special interfaces, and there is no possibility of removing an excitation from one terminal and placing it under a different terminal except by using a different special adapter.

Cunningham type cross-bar switching matrices have been implemented in some known equipment for interconnecting the test, stimulus and measure points. These cross-bar matrices are electromechanical devices which operate by latching energized relay contacts in a selected row" or "column" of the matrix that is electrically coupled to a terminal to be connected. Any conductors intersecting the selected row and connected to the latched relay contacts are thereby brought into circuit. These devices are practically limited to providing a connection between only two terminals simultaneously and, because of their inherent limitations, can establish connections only between selected groups of terminals.

Similarly, other test equipment switching arrangements have used a single relay with tens or hundreds of contacts which move into engagement at the same time and therefore connect a single terminal to a multitude of interconnecting buses simultaneously. These systems are intended primarily for checking continuity or resistance between two or more terminals.

In general, therefore, the automatic switching and test apparatus that have been used previously to the invention are characterized by serious operational limitations in switching, routing and programming which preclude their universal adaptability to the testing of all types of circuits. Although many existing systems can be operated by unskilled personnel, they must be programmed by persons having an intimate knowledge of the system's routing limitations and, further, necessitate that the programmer accurately keep track of the status of all terminals as each new step is added to the test procedure. In any event, most such systems are dedicated to the testing of a single product or electronic device.

The present invention has as one of its primary objects, therefore, an improved automated routing system which is capable of automatically interconnecting two or more terminals, via one of a plurality of pre-existing circuit paths. As a more specific object, the invention is intended to overcome the several shortcomings of the prior art approaches to automated testing of electrical circuits and systems. To this end, and as a further object of the invention, a computer including an online compiler is implemented to accept program instructions from the operator and convert them immediately into machine responsive object code that controls the switch means for interconnecting selected terminals over assignable circuit paths within the system, as well as the operative and analytical test steps. At the same time, the system checks the validity of any command to perform a particular test or to make a connection and uncovers programming or connection errors before the test or connection actually is executed. Thus, a further object and advantage of the present invention is the obviation of damaging misconnections by self-implementing safeguards.

SUMMARY OF THE INVENTION

In brief, the invention achieves these and other objects by a signal routing system capable of interconnecting selected terminals through one of a number of assignable circuit paths, each of which is connectable to the selected terminals by uniquely controlled switch means. Each terminal of the system is associated with switch means operated by control means that is responsive to commands (such as from a test program entered into the system by a computer terminal) and performs the steps of determining from a stored indication the availability of any circuit path for connection in the circuit desired to be established, assigning the circuit path determined to be available to one of the selected terminals, assigning the other selected terminal to the assigned bus, storing an indication of the circuit path and terminals so assigned and operating the switch means to connect the selected terminals to the assigned circuit path.

Unlike the systems used heretofore, the invention draws upon a stored indication of available interconnecting paths for arriving at the precise switch means to be operated in order to establish the new connection. When the new connection is made, information regarding the terminals and circuit paths involved is likewise stored and available for interrogation upon subsequent commands.

The invention embraces a plurality of connectable terminals, plural signal channels by means of which any two terminals may be interconnected, memory means for storing an indication of the connection status of the terminals and the signal channels, and switch means jointly responsive to the memory means and a connection command for selecting a new connection route between the terminals desired to be interconnected via one of the signal channels.

As applied to automatic diagnostic circuit testing, the invention preferably incorporates certain operations offering maximum security against inadvertent connections which could damage the unit under test. Specifically, the peripheral equipment for diagnosing and testing the circuit is categorized into various types of devices, including stimulus devices, measurement devices, loads, and so forth. If a terminal to enter into the test is hooked to a measurement device, the system is capable of determining the pre-existing connections of any unit designated pins to a path other than an assigned circuit path and disconnecting such pins from the unassigned path before reconnecting them by the switch means to the assigned path. As a corollary to this procedure, any UUT pins connected to the assigned path, but not designated in the particular measurement test step, are disconnected from the assigned circuit path prior to connecting the measuring device. These operational facets of the system avoid most of the possibilities for inadvertent misconnections.

The system also provides for the routing of signals over a specific available path and, thereafter, permitting other signals to be sent over that same path without breaking any preexisting connections desired to be retained.

In another vein, the system may be operated to give priority to certain signal paths according to the nature of the signal to be conducted. In this connection, the invention is capable of differentiating between exciting and non-exciting signals involved in a test. Excitation or stimulus signals are usually of higher current value than UUT output signals, as the latter are provided to what is generally a high impedance instrument. If the signal is classified as a high current signal, a preselected group of circuit paths is given preference over another such group that is given priority for low current signals. This arrangement permits low power signals to be sent to measuring instruments over electrical circuit paths which may include a switch and contacts which have not been "contaminated" through the repeated conduction of high current levels. Relay contacts, for example, tend to pit and otherwise deteriorate upon repeated switching under load and thereby ultimately provide a less resistance-free connection after a period of time.

A distinct advantage of the invention is its modularity, i.e., its inherent adaptability to expansion by adding, for example, new peripheral test equipment, or additional terminals. This modularity is achieved, in part, by incorporating a number of assignable existing circuit paths to which all switch means are connected. It is also in part achieved by the switch control means, comprised basically of a computer programmed with permanent operating software that is unaffected by either the numer of peripheral test devices or the number of connectable terminals. Since the switch means (associated with the terminals) and the peripheral supporting equipment are controlled by signals on the computer input/output (I/O) bus, expansion is obtained simply by coupling any further devices or switch means to the computer I/O bus and providing a proper address so that it responds to appropriate signals from the computer.

The operating software of the system provides for the storage of data recording the status of each of the terminals and buses that is brought into the routing process during the conduction of any test or program. It is only required in this case that the storage medium for the system be sufficient to accommodate the maximum number of terminals and devices that would be brought into operation during any single program.

Among specific advantages of the invention, the switching system hardward allows stimulus devices to be applied to any pin or any possible combination of pins (terminals) of the unit under test; it allows the stimulus and measurement devices to be connected internally for the checking of signals before application to the UUT and for self-test, and it will allow the simultaneous application of every device (stimulus and measurement) in the system to any pins or any combination of UUT pins. At the same time, the operating softward system safeguards against the inadvertent creation of undesirable connections. For example, the shorting of two stimulus devices by connection to the same pin, placing a measurement device on more than one pin (thus shorting the UUT) are some operations automatically precluded by system routines. As already noted, a record is kept of all the actions occurring within the switching system so the program writer need not worry about the internal workings of the switching system but only about the substantive test to be undertaken.

Owing to the unique arrangement of the switching means, the invention further allows all UUT pins to be joined to either a stimulus point or a measurement point with a four-wire circuit. Thus, Kelvin or remote sensing connections can be made at the UUT interface for high accuracy resistance measurements and accurate power supply regulation.

From the standpoint of programming tests in source code (i.e., a suitable recognizable language convenient to the operator), the system incorporates on-line compiling which is capable of validating the instruction language, and converting source language into machine object code containing calls to the software sub-routines (e.g., a measurement sub-routine and the addresses) of all data required to fully execute the test step. Such data may embrace both that provided by the operator (e.g., circuit performance tolerances in the form of voltage, current or resistance values) and data developed by the system by measurement or computation. The permanent sub-routines provide for the generator of warnings and other indications of error in the program (prior to execution) or of malfunction in the UUT (during execution).

Different from the previous approaches to automated testing, the invention uses the operator's instructions (in a comprehensible format) to initiate permanent softward sub-routines through the compiler. From this viewpoint, the invention comprises means for converting input command signals into directions to incorporate into the test procedure one or more continuously resident routines stored in the mass memory. These routines provide the operating framework for the manner in which the test station operates in performing steps specified by the operator, including signal routing, applying stimulus signals and monitoring response signals. As discussed herein in detail, one such series of sub-routines is carried out whenever any connection is specified by naming UUT pins.

BRIEF DESCRIPTION OF THE DRAWINGS

A complete understanding of the invention, together with its further advantages, can be obtained from the following detailed description and the accompanying drawings, wherein.

DESCRIPTION OF THE PREFERRED EMBODIMENT

Figure 1:
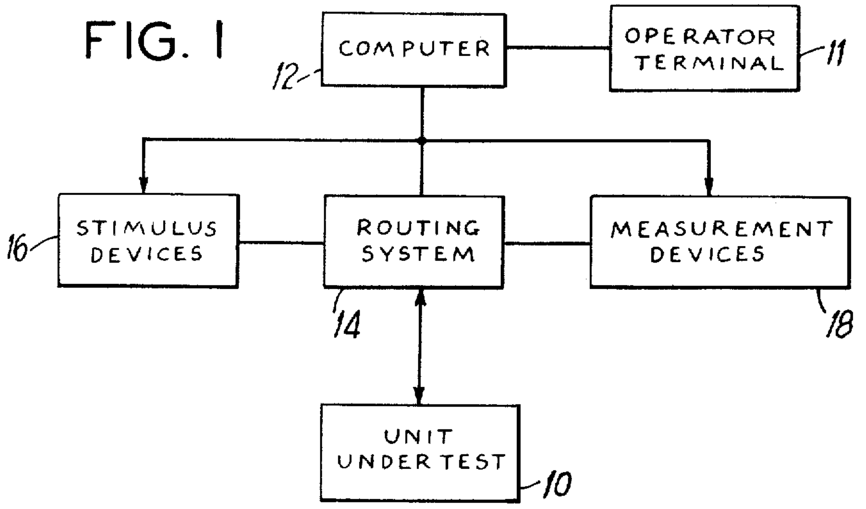
FIG. 1 is a schematic block diagram of a diagnostic circuit tester embodying an automated routing system according to the invention.

FIG. 1 shows the relationship of the fundamental elements of a universal diagnostic circuit testing apparatus, implementing an automated routing, or switching, system pursuant to the invention. Instructions to the system to perform certain analytical tests upon a unit under test (UUT) 10 are entered into the system computer 12 by a suitable operator's terminal 11, such as a keyboard, magnetic tape reader, punched paper tape or disk, etc. The routing system 14 then, under control of the computer 12, establishes the desired interconnections between the pins or terminals of the UUT 10 and the various stimulus devices 16 and the measurement devices 18. Desirably, there is an interchange of data between, at least, the measurement devices 18 and the computer 12, so that the computer may provide indications of normal or abnormal test results and also, if an abnormal reading is obtained, alter the sequence of the following steps in order to determine the precise nature of the malfunction or irregularity.

It should be noted that, unlike many of the prior art systems, neither the stimulus devices 16 nor the measurement devices 18 are permanently connected, or dedicated, to the unit under test over any fixed circuit path. To the contrary, these devices may be connected over any of the number of existing circuit paths to the unit under test 10 (over even to each other) under control of the routing system 14.

The Test System

Figure 2:
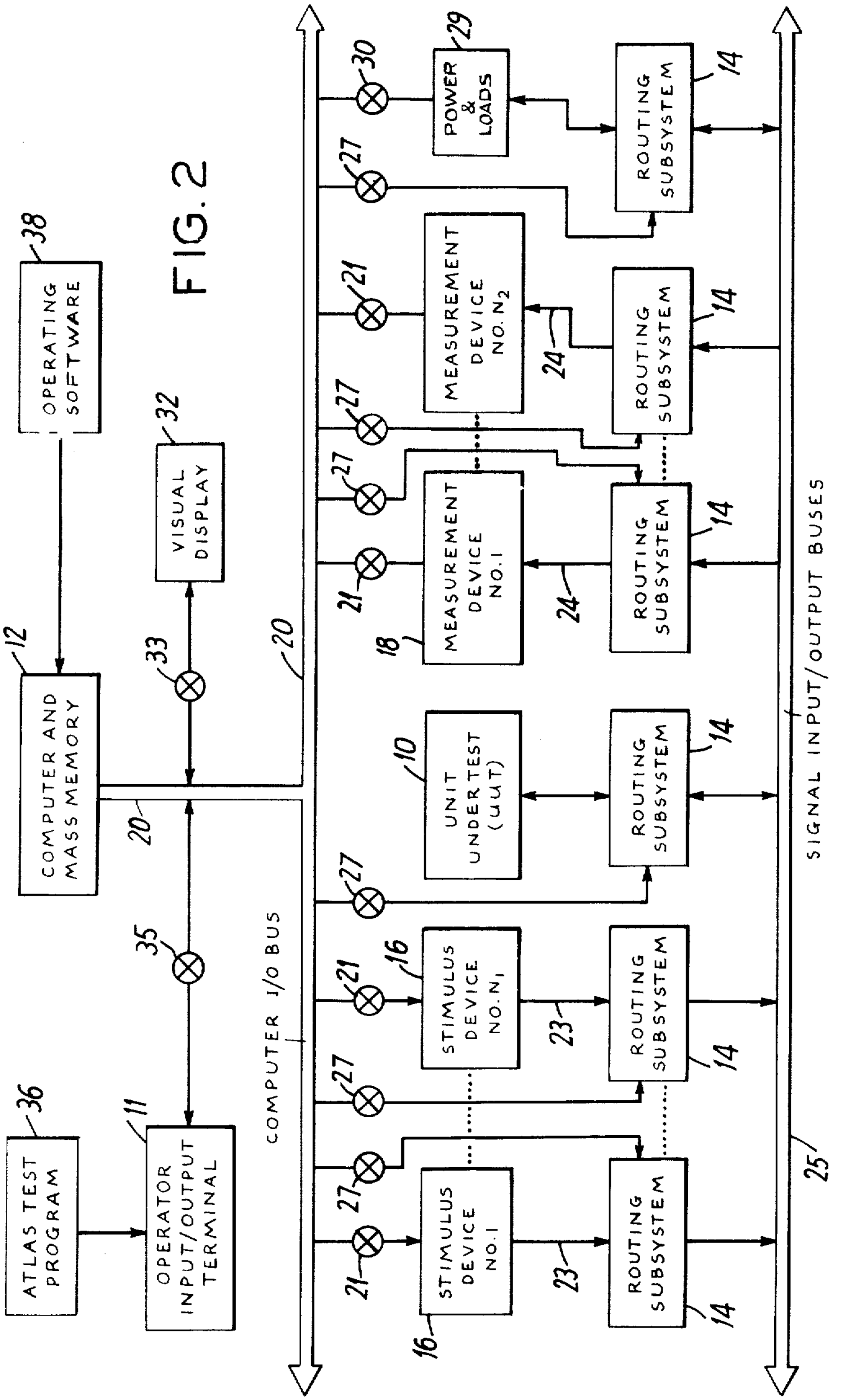
FIG. 2 is a more detailed schematic block diagram of the apparatus depicted in FIG. 1.

Referring to FIG. 2, the manner in which the devices are hooked to the computer and to the UUT can be seen. Each of the stimulus and measurement devices 16, 18 is coupled to the input/output (I/O) bus of the computer 12. This bus, as those skilled in the art understand, actually comprises a number of conductors over which data and command signals are transmitted to and from the computer, including the computer's mass memory, and is to be distinguished from conductors used in forming desired connections between devices and the cast pins.

Each device is controlled by commands from the computer and intercepted by an electronic interface called a device controller 21, which converts computer commands into signals which the device recognizes and to which it responds. These commands are those, for example, which instruct the device to apply a stimulus signal to the UUT, or to measure the response of the UUT. Commands are also used to program the operation of the device. As an example, a digital multimeter can be programmed to measure different quantities (AC volts, DC volts, current resistance, etc.) over several different ranges of sensitivity (10 volts, 1 volt, 0.1 volt, ohms, kilohms, etc.)

The output leads 23 of the stimulus devices and the measuring input leads 24 for the measurement devices are connectable to the unit under test through a portion of the routing system 14, as shown. As will be explained shortly, the routing subsystem for each device comprises switch means which close a circuit between the device and the unit under test over one or more signal input/output buses 25. These buses are physical conductors located in the system.

To energize the routing system, or the routing subsystem associated with the particular leads or terminals to be interconnected, a device controller 27 accepts commands from the computer I/O bus and processes them for utilization by the switch means of the routing system. In FIG. 2, the device controller 27 for the routing system is shown as a series of separate units associated with the separate portions of the routing system (the routing subsystems) 14 for each of the devices and the unit under test. It will be understood, of course, that the device controller 27 is preferably a single device serving the entire routing system.

The diagnostic system also may be equipped with fixed power supplies and loads, indicated at 29, under control of the computer through a suitable device controller 30 and similarly coupled to the signal I/O buses 25 through a portion of the routing system 14. By this means, fixed power and loads may be applied to the terminals of the UUT 10.

As further illustrated in FIG. 2, a suitable visual display 32 is provided, operated through its own device controller 33 and providing a visual presentation of measurements, malfunctions, the status of the system, and the like. In a similar manner, the operator input/output terminal communicates with the computer and the memory via the device controller 35. It is through this terminal that the test program, usually constituted of a series of operational steps to be performed upon the UUT by the equipment, is entered into the computer. This program has been designated as the adapted "ATLAS" ("abbreviated test language for avionics systems") type, which is easily adapted to the universal testing of all types of electrical systems. Adapted ATLAS (hereafter referred to simply as ATLAS) utilizes an abbreviated, English word vocabulary dealing with test functions commonly encountered in electrical systems. It is this language that the operator, through the terminal 11, uses to communicate with the equipment and thereby to control the nature and sequence of the test steps. Desired circuit connections between the pins of the UUT and the terminals of the measurement and stimulus devices are established simply by issuing an instruction to perform some test or function involving UUT pins.

The operating software, designated by the schematic block 38 in FIG. 2, is distinguished from the test program 36 entered by the operator. The operating software is contained in the computer memory and forms the internal rules of machine operation. The ATLAS program is the comprehensible source language which is compiled by the computer into source code and, hereafter into machine responsive object code for processing and execution by the resident software. As applied to the routing of signals between the system equipment and the unit under test, the operating software is found in the flow charts of FIGS. 11–20.

PROGRAMMING THE SYSTEM

The system is "programmed," or instructed to stimulate and measure conditions on the unit under test (the UUT), under control of test statements composed by the operator in a comprehensible language format. Reliance is thus placed on the test programmer for the logical definition of test sequences to be performed. Unlike prior art systems, however, test sequences cannot only be entered conveniently, but also can be modified at any time (other than execution), stored and recorded for future use and modification. Owing to the flexible access to a complete program sequence, interruption by the operator at virtually any time is possible in order to dictate a new logical operation, without losing either the original test program or the existing device connections or measurement readings.

Because the test program is maintained resident in the core (the memory) of the control computer in the form of validated source code, it is possible for the operator to analyze results and quickly perfect the experimental test sequence by adding, subtracting or simply changing a test step or series of test steps. Once this source code program is compiled, however, a hybrid object code is formed, consisting of calls to permanently resident operating software that is capable of executing the test program of the object code at object code, or computer, speeds without drawing further upon the intermediate source code prepared from the test statement language entered by the operator. This permits storage of the resident software in minimum core area.

A control section of the system computer issues necessary instructions (in accordance with operator demands) to compile a source-coded program into object code; to execute a test, resulting in automatic compilation prior to execution if compiling has not been previously accomplished; to modify a test statement by reentering new source code test language; to accept new programs as, for example, from a magnetic tape cartridge; to halt execution of a test if an impermissible or undesirable condition occurs; and to record test results.

Figure 2A:
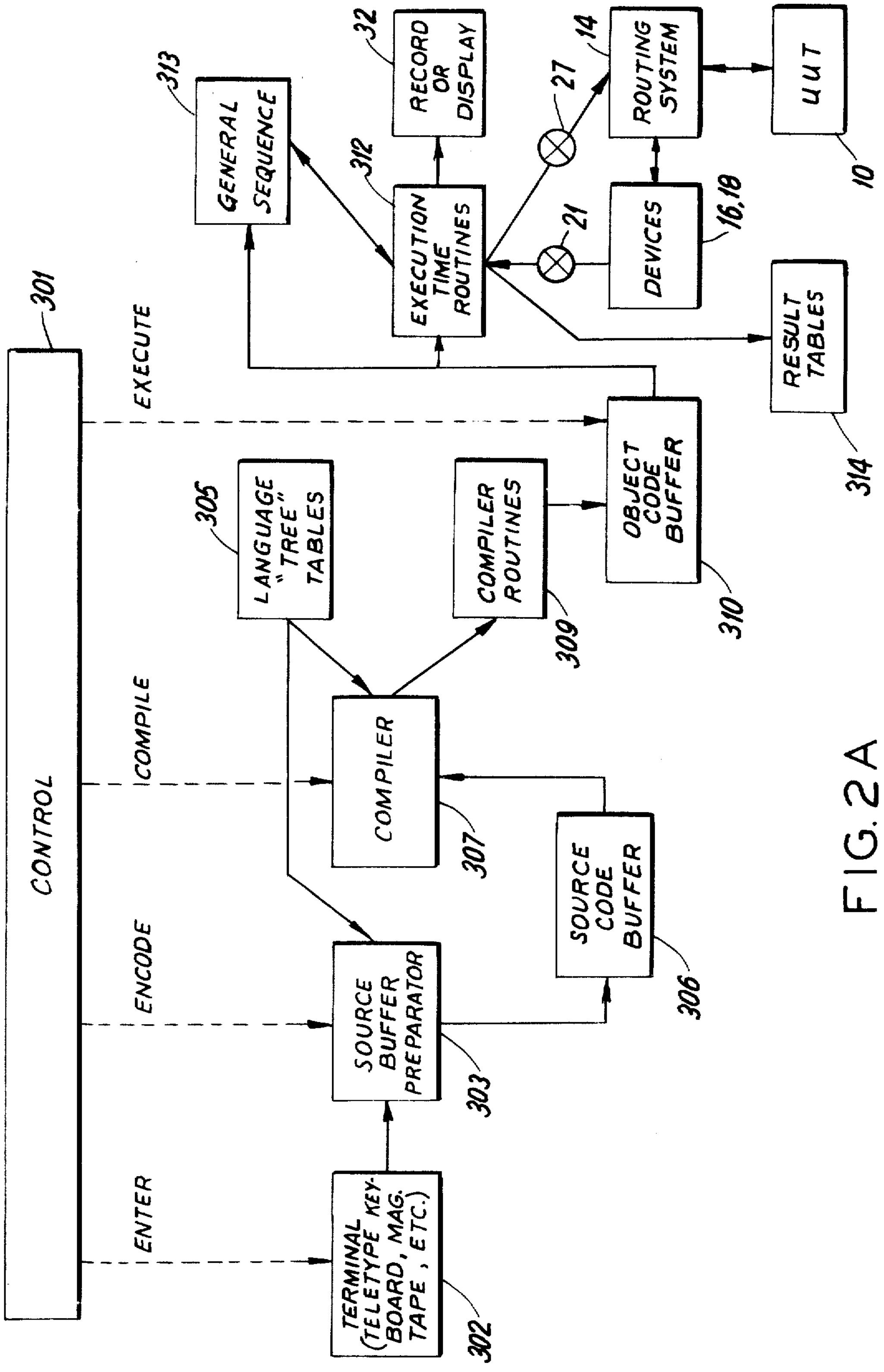
FIG. 2A is a schematic block diagram of the organization of the control computer according to the invention.

FIG. 2A is a block diagram schematic of the system and computer elements, explaining how test programs are entered, compiled and executed in accordance with the invention. A control section 301, which may include the system control panel issues control instructions (represented schematically by the dashed lines) to both auxiliary computer equipment such as the terminal, as well as directly to the computer. Although any suitable computer may be used in the system, the arrangement shown in FIG. 2A has been very satisfactorily implemented on a "Interdata Model 4" miniature computer having a mass memory capacity of 32 kilobytes.

A terminal 302, which should be understood to include any device for entering instructions in the form of a test program, provides step-by-step test language (e.g., modified ATLAS) to a source buffer preparator 303. The preparator validates the test language entered by the operator by a table look-up in the permanent language "tree" tables 305. These tables are so organized that the language components of the test statement may be validated by, first, ascertaining that the language entered is recognizable and, second, by insuring that following language components constitute proper instructions. For example, an instruction to measure, "MEA" should be followed by a proper parameter, such as "DCV," "RESIS," "FREQ," and so forth.

Under control of an "ENCODE" instruction from the control section 301, the source buffer preparator 303 encodes the input language into an intermediate source code which may comprise, for example, a simple number for each verb or parameter in the test statement. The encoded intermediate source code is stored in the source code buffer 306. This buffer has a capacity encompassing a good many test statements up to, for example, 100 separate test steps of a test program. The test program may now be compiled by the compiler 307.

During compilation, under a suitable command from the control section, the intermediate source code language is examined. The source code in the buffer 306 contains a suitable address to the language tree tables 305, so that, during compilation, the information stored in the source code buffer 306 may be used to obtain, from the tables 305, the address of the appropriate compiler routine, which is one of many such routines 309 resident in core. For example, the instruction to measure (MEA) may involve one or more sub-routines comprising the operating software. "ROUTE" is another such sub-routine, as will become apparent shortly. Thus, the compiler routines 309 comprise a series of calls to the sub-routines which are required to carry out the instruction represented by the intermediate code stored in the source code buffer 306. It will be understood by those skilled in the art that the compiler 307 is what is known as a table-driven compiler, also referred to as a separabletransition design compiler.

As a result of the compilation process, a hybrid object code is formed and stored in the object code buffer 310. Thus, the object code buffer includes calls to the operating (or execution time) routines 312, which may be called directly, as shown, or indirectly through a general sequence procedure 313. The ROUTE routine, for example, is called through GENERAL SEQUENCE 313. In this connection, it is significant to observe that compilation of the entire source code may take place at one time and, once compiled into the object code stored in the buffer 310, may be executed at computer speeds.

Communication between the devices 16, 18 and the software takes place through the device controllers 21, as already explained in connection with FIG. 2, and with the routing system 14 through a device controller 27. The unit under test, of course, is subjected to stimulus signals and provides response indications via the routing system 14.

A further feature of the invention is the ability of the execution time routine to draw upon results produced during the test sequence. Thus, measurement devices, for example, may provide data to the routines 312 which effect their storage in the result tables 314. These tables are dynamic; that is, the data stored for use by the routines 312 may change from time to time, and a routine may draw upon such data at any time commanded by the routine itself. Again, the object code buffer 310 specifies the particular execution time routine to be executed and these routines in turn may draw upon data stored in the object code buffer or other storage area identified by information in the object code buffer, or upon data stored in the result tables 314.

Results of the test may be recorded, or displayed in the form of a read-out, print-out, cathode ray tube indication, etc. at 32.

As mentioned briefly above, certain routines, such as ranging measurement devices may be called upon by a general sequence routine 313 which may execute a more general or overriding control on certain of the procedures carried out. As will become apparent shortly, the routing routine is called directly by general sequence rather than by the object code. This may occur as a result, for example, of any instruction which always involves routing, such as an instruction containing reference to UUT pin terminals. Whenever a UUT pin is specified, general sequence may automatically require a call to routing. In this same connection, while GEN. SEQ. 313 is separately indicated, it should be understood that it may be interspersed in time sequence with certain of the object code stored in the buffer 310. Thus, it is possible that general sequence 313 would be enlisted prior to or during execution of the object code.

The routing system will now be described in detail, both because of its contribution to the universality of the testing system and because it is also representative of the type of sub-routine which may be called by the object code. In the case of routing, though, the call originates from general sequence rather than directly from the object code.

System Routing

Figure 3:
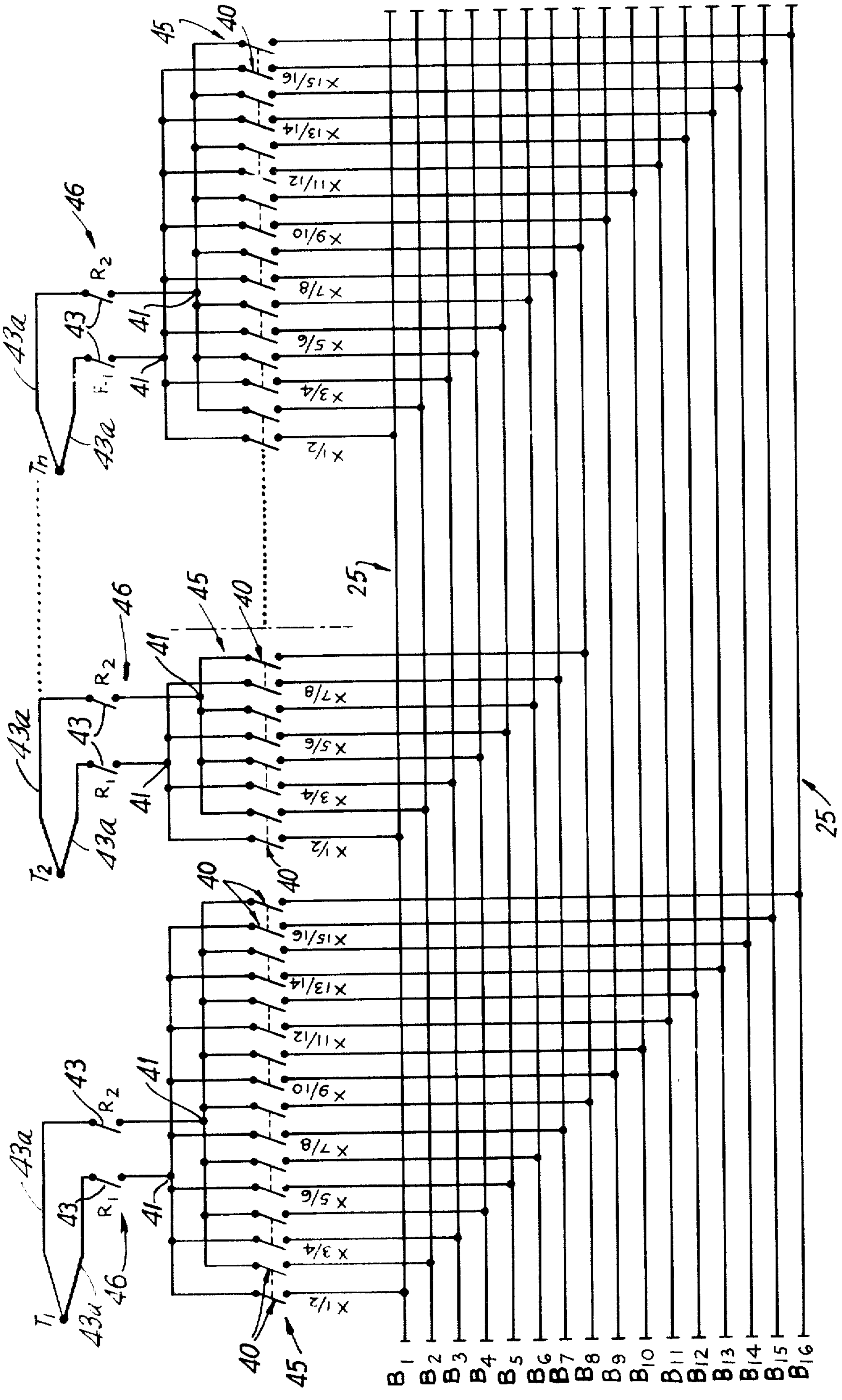
FIG. 3 is an electrical schematic of the buses and switches used in the routing system of FIG. 2.

FIG. 3 is a schematic representation of the switching matrix used throughout the routing system. Fundamentally, the switching matrix comprises a group of signal input/output buses 25 (recall FIG. 2), 16 individual buses $B_1$–$B_{16}$ constituting the bus group in the particular embodiment shown. Of course, the number of buses can be expanded indefinitely, but experience has indicated that a number of buses equal to about one-half the number of peripheral device terminals is usually sufficient.. The buses $B_1$–$B_{16}$ are the established circuit elements, or paths, over which all signals are routed between the devices and the terminals of the UUT.

The individual terminals $T_0$, $T_1$, . . . . $T_n$ are individually and selectably connectable to any one of the buses 25 through a "relay tree." This tree includes a separate pair of closable relay contacts 40 between each bus and an intermediate common node 41. A second set of relay contacts 42 completes the series circuit between each terminal and bus by closing the circuit between the common node point 41 and the terminal. It should be noted that the leads 43a are electrically and physically connected at the terminal so that a pair of conductors emanates from each terminal $T_0$ –$T_n$ to the relays $R_1$,$R_2$ . For a four-wire measurement, therefore, both relays $R_1$,$R_2$ are closed. Thus, in order to connect any terminal to a bus, it is necessary to energize two stes of relay contacts: a first set of contacts 40 of the network relays 45 and a second pair of relay contacts 43 belonging to mercury-wetted contact relays 46, which have the capacity to carry and switch higher currents and to switch signals without contact 'bounce.'

In order to limit the number of network relays 45 required, each network relay contains two movable armatures to close two sets of contacts 40, for adjacent buses. The particular bus to which the terminal is to be connected is then selected by closing the contacts 43 of its appropriate mercury relay $R_1$, $R_2$, the $R_1$ relay operating in the case of the odd-numbered buses and the relay $R_2$ operating in the case of the even-numbered buses. For example, to connect terminal $T_0$ to bus $B_9$, the network relay $X_9$/10 is energized to close an intermediate electrical circuit between each of the buses $B_9$, $B_{10}$ to the common nodal points 41. The bus $B_9$ is selected by then closing the contacts 43 of the mercury relay $R_1$.

In practice the network relays 45 are energized and de-energized only after the mercury relays 46 have been opened to break the series circuit between the terminal and one of the buses. To couple a previously unconnected terminal to one of the buses, therefore, the appropriate relay of the network relay group 45 for that terminal is operated; thereafter, the contacts 43 of the appropriate mercury relay 46 are closed to complete the connection. Disconnection of a terminal from a bus is brought about by de-energizing any energized mercury relay 46 and, after the mercury relay contacts 43 are opened, by opening the closed contacts 40 of an appropriate one of the network relay 45.

Figure 4:
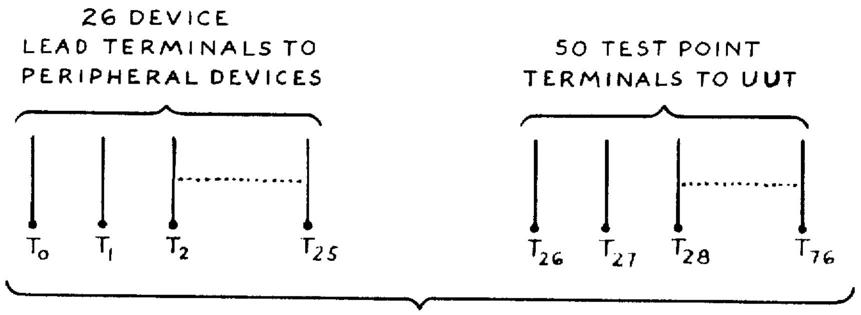
FIG. 4 is a diagram showing a typical assignment of system terminals to equipment devices and UUT pins.

From inspection of FIG. 3, it should be apparent that by closing selected mercury and network relays associated with each terminal, any terminal can be interconnected with any other terminal by one of the buses $B_1$–$B_{16}$. A terminal $T_0$–$T_n$ may be connected in any desired manner to a lead of a peripheral test device or to any of the pins of the unit under test. FIG. 4 shows a typical division of 76 terminals according to function in a representative system. As shown there, 26 terminals are used for connection to the leads of the test devices. The remaining 50 terminals, $T_{26}$–$T_{75}$, are available for connection to the individual pins of the circuit to be tested.

Figure 5:
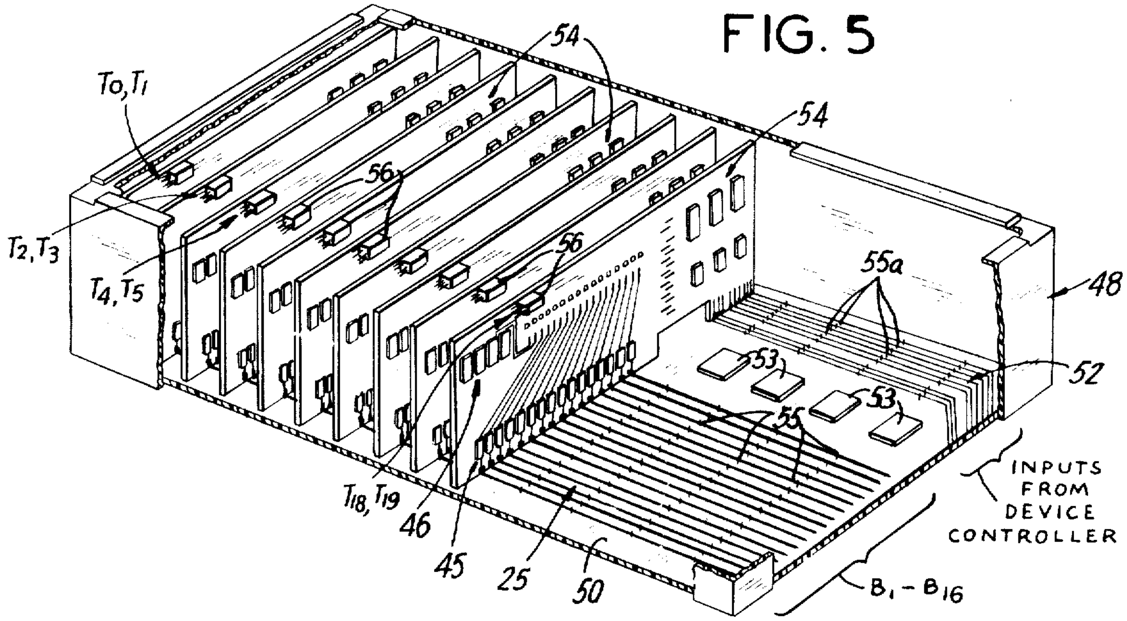
FIG. 5 is a perspective view of a switching drawer containing the buses and switches for the routing system.
Figure 7:
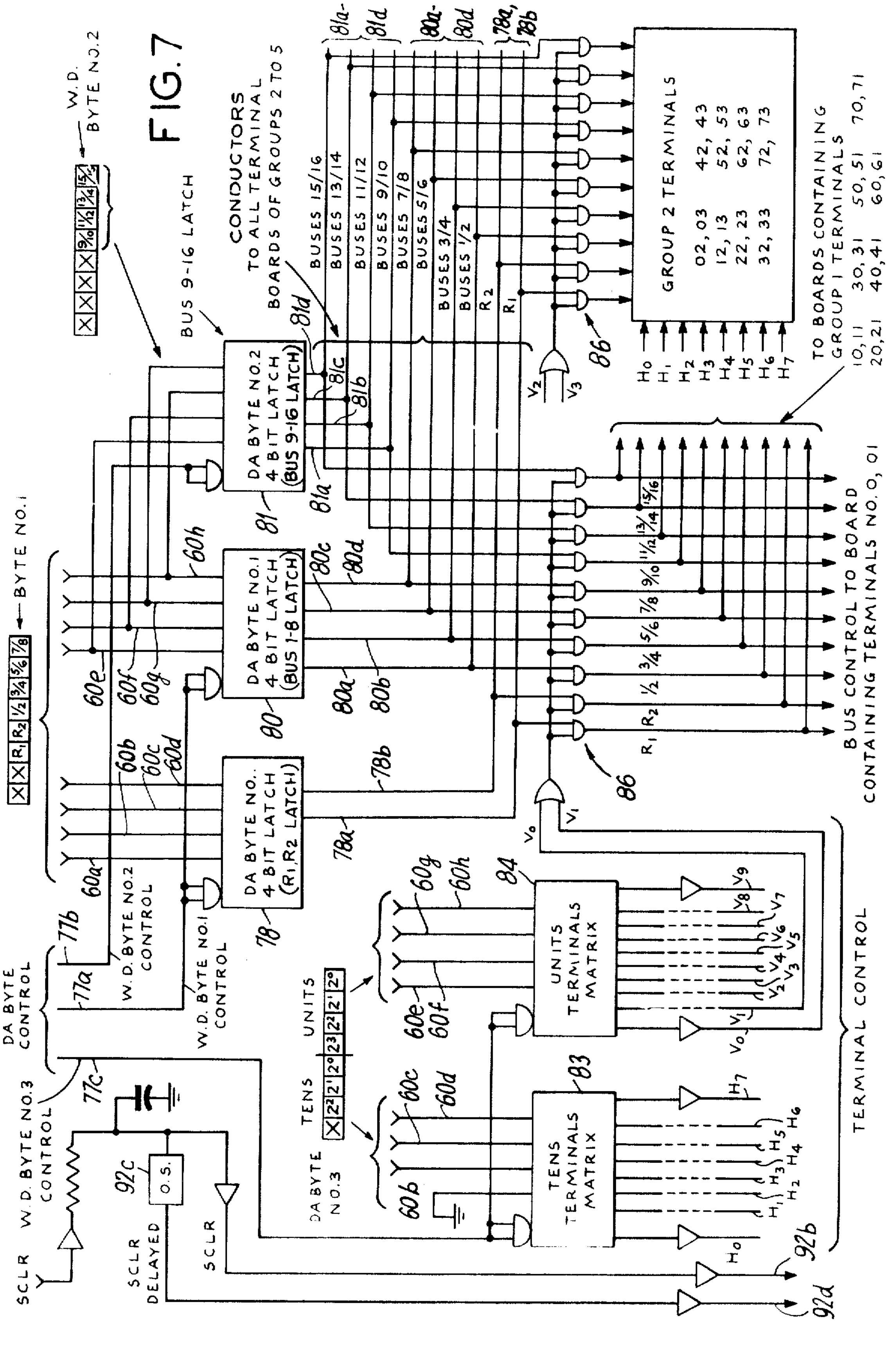

FIG. 5 illustrates the physical construction of the routing system, including the buses and relay switches. Most of the logic circuitry and all of the buses and relay switches are contained in a single drawer 48. At the bottom of the drawer is a large printed circuit board 50 which carries the signal buses $B_1$–$B_{16}$, signal conductors 52 for transmitting the signals between the switching drawer and the device controller (not shown), and certain of the logic and control electronics including integrated circuits 53, for obtaining the energization and de-energization of the correct network and mercury relays. An electrical schematic of the circuitry contained on the master printed circuit board 50 is shown in FIG. 7.

All of the switching relays 45, 46 and the terminals $T_0$–$T_{75}$ are contained on 38 individual printed circuit cards 54 which are mutually spaced in the vertical position within the drawer 48. Those cards 54 removably engage conductive clips 55 to interconnect electrically the edge connectors of the printed circuit cards 54 with the buses 25. Similarly, the edge connectors leading to the control circuitry on the cards engage similar clips 55*a* on the control conductors 52.

Each card provides two terminals to which access is gained at a two-prong terminal plug 56 near the top edge of the card. Mating receptacles (not shown) wired either to the device leads or the UUT pin receptacles, as the case may be, complete the electrical connections to the unit under test and the peripheral devices. Each card 54, accordingly, contains the necessary relays and associated logic and control circuitry for connecting each of two terminals to any of the other terminals via one of the signal input/output buses 25. As already noted, control signals from the computer are intercepted by the device controller (not shown), processed, and impressed upon the control conductors 52.

The Switching Logic

Figure 6:
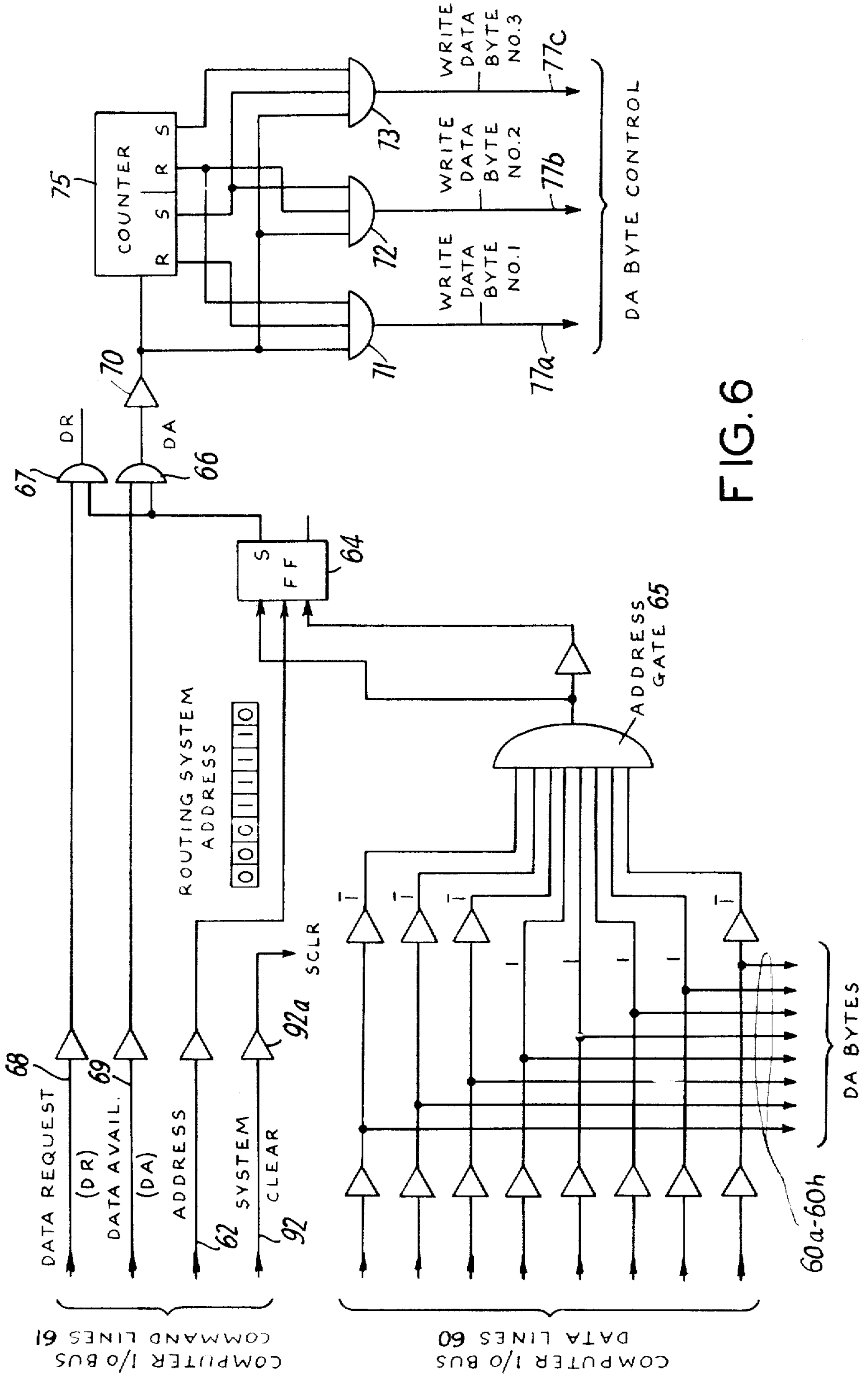
FIGS. 6–8 comprise an electrical schematic diagram of the routing system, showing the electronic control and logic circuitry for selectively interconnecting two or more system terminals.

FIG. 6 represents the electronic elements of the device controller for the switching drawer 48 shown in FIG. 5. Inputs to this device arrive over the data lines 60 and command lines 61 of the computer I/O bus. Data enters the controller in the form of a 8-bit byte on the lines 60, whereas commands occur on the lines 61 in the form of single bits each representing a specific command. If, for example, during the progress of any test program a routing operation is to be carried out (and this includes the connection of disconnection of any device or terminal or the opening and closing of any switch), the routing system is addressed by the computer. In this case, the "address" conductor 62 is excited to condition a flip-flop 64 for energization by the output of the address gate 65.

If the bit pattern then on the data lines 60 corresponds to the logic to produce a signal at the output of the address gate 65, which is the bit pattern 00011110 shown in FIG. 6 as the routing system address, the flip-flop 64 produces a 1 at its set output. This conditions a data available (DA)AND gate 66 and a data request (DR) AND gate 67 to produce an output if the computer impresses a bit on the line 69 to notify the routing system that data is available on the data lines 60 of the computer I/O bus; or calls for data (a data request) by energizing the command input line 68. Thus, as each data byte is introduced on the data lines 60 of the computer I/O bus, a pulse appears on the data available command line 69.

The first data available bit to arrive thus produces an output of the AND gate 66 and its inverter 70. This output is fed to each of three AND gates 71, 72, 73 whose outputs indicate whether the information being received on the computer I/O bus constitutes the first, second or third data byte. The three data bytes addressed to the routing system control the energization and de-energization of the relays 45, 46 and are derived from information stored in the system files.

The outputs from devices 71, 72 and 73 are obtained as follows. Upon production of the first pulse at the output of the inverter 70, the AND gate 71 produces an output pulse indicating that the first data byte is being received. The signal at the output of the inverter 70 also advances a counter 75 from a 0 count to a 1 count and thereby conditions the AND gate 72 for a high output upon arrival of the next data available pulse. Similarly, after the second data byte arrives, the counter 75 is advanced to a 3 count and thereby conditions the third AND gate 73 for a high output upon arrival of the third data available pulse. In Summary, the AND gate 71 output is high when the first data byte arrives on the computer I/O bus data lines 60, and the AND gate 72 output is high when the second data byte arrives on the I/O bus lines 60 and the AND gate 73 output is high when the third data byte is received.

Any pulse information entering the data lines 60 is tapped from the outputs of the inverters driving the address gate 65 and is made available to the switching drawer 48 over the conductors 60*a* – 60*h*. The outputs of theAND gates 71–73, on the other hand, are connected to the conductors 77*a* – 77*c*. The conductors 60*a* – 60*h* and 77*a* – 77*c* are the outputs of the device controller and comprise those inputs to the switching drawer 48 which are electrically connected to the printed circuit conductors 52 on the large printed circuit board 50.

FIG. 7 represents an electrical schematic diagram of the logic circuitry contained on the printed circuit board 50, the inputs over conductors 77*a* – 77*c* and 60*a* – 60*h* being shown in the upper portion of the drawing. From inspection, it can be seen that the signals on the conductors 77*a* – 77*c* control operation of the 4-bit latches 78, 80, 81 and the matrices 83, 84. If the control line 77*a* is energized, the latches 78, 80 come into play; if the line 77*b* is energized, only the latch 81 is operable. When the control line 77*c* is energized, the matrix units 83, 84, are conditioned to provide outputs. The first write data byte on the conductors 60*a* – 60*h* thus operates the latches 78, 80; the second write data byte on those conductors operates the latch 81, whereas the third write data byte energizes selected outputs of the matrix units 83, 84.

It should be understood that the sequential logic approach just described is used because three data bytes are required to select a particular switching relay in the drawer 48. Where a larger number of data lines is included in the computer I/O bus to permit access to more information at a given instant of time, it is possible to reduce the complexity of the data byte logic.

At this juncture, it is convenient to note that the two output lines of the latch 78 enter into controlling the operation of all of the mercury relays 46 in the routing system. A Signal on the output lines 78*a*, 178*b* controls the energization and de-energization of the relays $R_1$, $R_2$, respectively. The outputs 80*a* – 80*d* of the latch 80 control the energization and de-energization of the four relays associated with the buses $B_1$, $B_8$ whereas the four outputs 8/*a* – 8/*d* of the latch 81 control the relays associated with buses $B_9$, $B_{16}$. These outputs feed a series of AND gates 86 for each separate group of terminal board cards 54, the outputs of the several AND gates 86 being supplied to each terminal board card in that group.

It should be apparent from the foregoing that write data byte No. 1 will control operation of both of the mercury relays $R_1$, $R_2$ and the network relays 45 associated with the buses $B_1$ – $B_8$. Write data byte No. 2 controls the operation of the network relays 45 associated with the buses $B_9$ – $B_{16}$. Write data byte No. 3, on the other hand, addresses a particular one of the terminals $T_0$ –$T_n$ so that the network and mercury relays for only the addressed terminal are operated.

Selection of the desired terminal involves the matrices 83, 84. The matrix unit 84 provides an output on one of ten output lines $V_0$–$V_9$ in response to the four "units" bits of the data byte No. 3, as illustrated. The "tens" matrix 83, on the other hand, provides eight output lines $H_0$–$H_7$ which are energized in accordance with the three "tens" bits of the data byte No. 3. The matrix outputs $H_0$–$H_7$ may be thought of as the horizontal lines of an electrical logic matrix, whereas the outputs $V_0$–$V_9$ of the "units" matrix 84 may be thought of as the vertical lines of the logic matrix. A signal output on one output line of each of the matrices 83, 84 thus defines a specific one of the terminals $T_0$–$T_{75}$.

Figure 8:
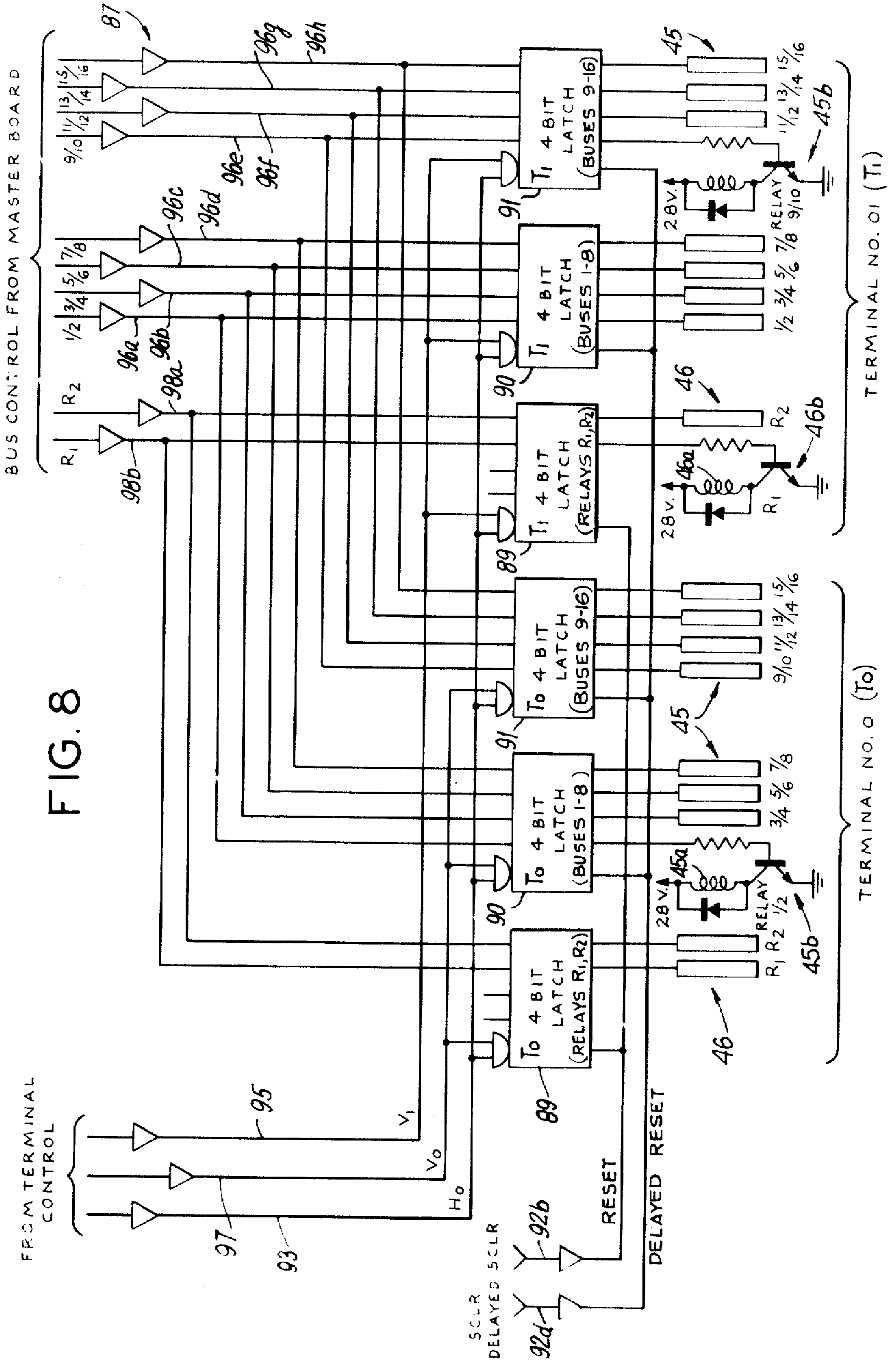

FIG. 8 shows the logic circuitry of each printed circuit terminal board 54, which controls the switching relays. For purposes of explanation, it is assumed that the card in question carries terminals $T_0$ and $T_1$. The outputs of the AND gates 86 (FIG. 7) constituting the bus control signals feed a series of inverters 87 whose outputs, in turn, drive six 4 -bit latches, three latches 89–91 for each of the terminals. These latches generally repeat the function of the latches 78, 80 and 81 discussed in connection with FIG. 7, in that their outputs determine the particular relays to be energized. As illustrated, each terminal has a latch 89 for controlling the mercury relays $R_1$, $R_2$; a latch 90 for controlling the four relays for the buses $B_1$, $B_8$; and a latch 91 for controlling the four relays to switch the terminal into electrical connection with the buses $B_9$, $B_{16}$. The rectangles shown connected to the outputs of these latches represent the coil circuits of the relays 45, 46.

A few of the relays and their driving circuits have been shown in detail for purpose of clarification. The relay coils 45*a*, 46*a* for the network and mercury relays respectively, are connected in series with the collector-emitter path of the driver transistors 45*b*, 46*b*, respectively, with the latch output signal being applied to the base of the drive transistors.

Relays associated with a particular terminal are brought into operation by the simultaneous application to a given latch of (1) a signal from the "tens" matrix 83, (2) a signal on one of the output lines of the units matrix 84 and (3) a bus control signal on one of the input lines 96*a*–96*h* to the latch from the inverters 87.

To connect the terminal $T_1$ to the bus $B_8$, for example, a 1 appears on the following conductors: the conductor 93 carrying the signal $H_0$, the conductor 95 carrying the signal $V_1$ from the "units" matrix 84 and the output conductor 96*a* of the inverter designated 7/8. There is no high signal on the conductor 97, which bears the output $V_0$ from the units matrix, inasmuch as this conductor would be energized only for the terminals $T_{10}$, $T_{20}$, $T_{30}$, etc. The signals $H_0$ and $V_1$ on the conductors 93 and 95 condition the latch 90 for the terminal $T_1$ to produce an output upon the arrival of a signal on any of the four input lines 96*a*–96*d* thereto. In the example, a signal would appear on the input line conductor 96*d* and thereby energize the output relay $X_{7/8}$ for terminal $T_1$. Later, another signal would be presented on the conductor 98*a* leading to the latch 89 to bring about the subsequent energization of the mercury relay $R_2$ and thereby complete the connection between the terminal $T_1$ and the bus $B_8$.

It is possible to clear (de-energize) all of the relays, if desired, by issuing a "system clear" (SCLR) command. Referring to FIG. 6, a SCLR command enters the device controller from the command line 92 and exits from the inverter 92*a* to the circuitry (FIG. 7) on the master board 50. From there it proceeds over the conductor 92*b* to the terminal boards 54. The SCLR LR command also is delayed by a one-shot multivibrator (FIG. 7) and issued over the conductor 92*d* to the terminal boards. The SCLR command resets the latches 89, thus opening the mercury relays $R_1$, $R_2$. The delayed SCLR thereafter resets the latches 90, 91 and de-energizes the network relays after the mercury relay contacts have been opened.

In operation, the switching logic functions as follows in making a connection to a bus:

Referring to FIG. 6, the routing system is addressed by a signal on the conductor 62 of the I/O command bus 61, and the bit pattern on the computer I/O bus data lines 60 is such to provide an output of the address gate 65. These conditions result in the setting of the flip-flop 64 and the conditioning of the AND gate 66 to ready the system to receive data in the form of data bytes over the data lines 60. Next, the write data byte No. 1 is written on the computer I/O bus data lines 60 and a pulse appears on the "data available" command conductor 69 (FIG. 6). As a result, a logic 1 appears at the output of the gate 66 and on the data byte control line 77*a*. Depending on the bit pattern of the first write data which is also impressed (inverted) on the conductors 60*a* –60*d*, selected output lines (78*a*–78*b*, 80*a*–80*d*) of the latches 78, 80 are (or are not) energized.

Following these events, the second write data byte is written on the computer I/O bus, and a "data available" pulse appears on the command conductor 69 of the I/O command bus 61. This pulse advances the counter 75 to provide a logic 1 on the data byte control line 77*b* and conditions the latch 81 (FIG. 7) for operation in accordance with the bit pattern of the write data byte No. 2. Similarly, when the third write data byte is impressed on the computer I/O bus 60, the counter 75 advances another count, rendering the conductor 77*c* energized to condition the two matrices 83, 84 for operation. Selected ones of the outputs $H_0$–$H_7$ and $V_0$–$V_9$ are energized pursuant to the bit pattern of the data byte No. 3. The outputs of the latches 78, 80, 81 are ANDED in the gates 86 and fed to the latches 89–91 for each terminal. However, only the terminal receiving signals from both of the energized outputs of the matrices 83, 84 can be made to respond to the signals from the outputs of the AND gates 86. While the latches 89–91 for all of the terminals are latched for energization according to their inputs, they provide outputs only upon arrival of the third write data byte.

Figure 9:
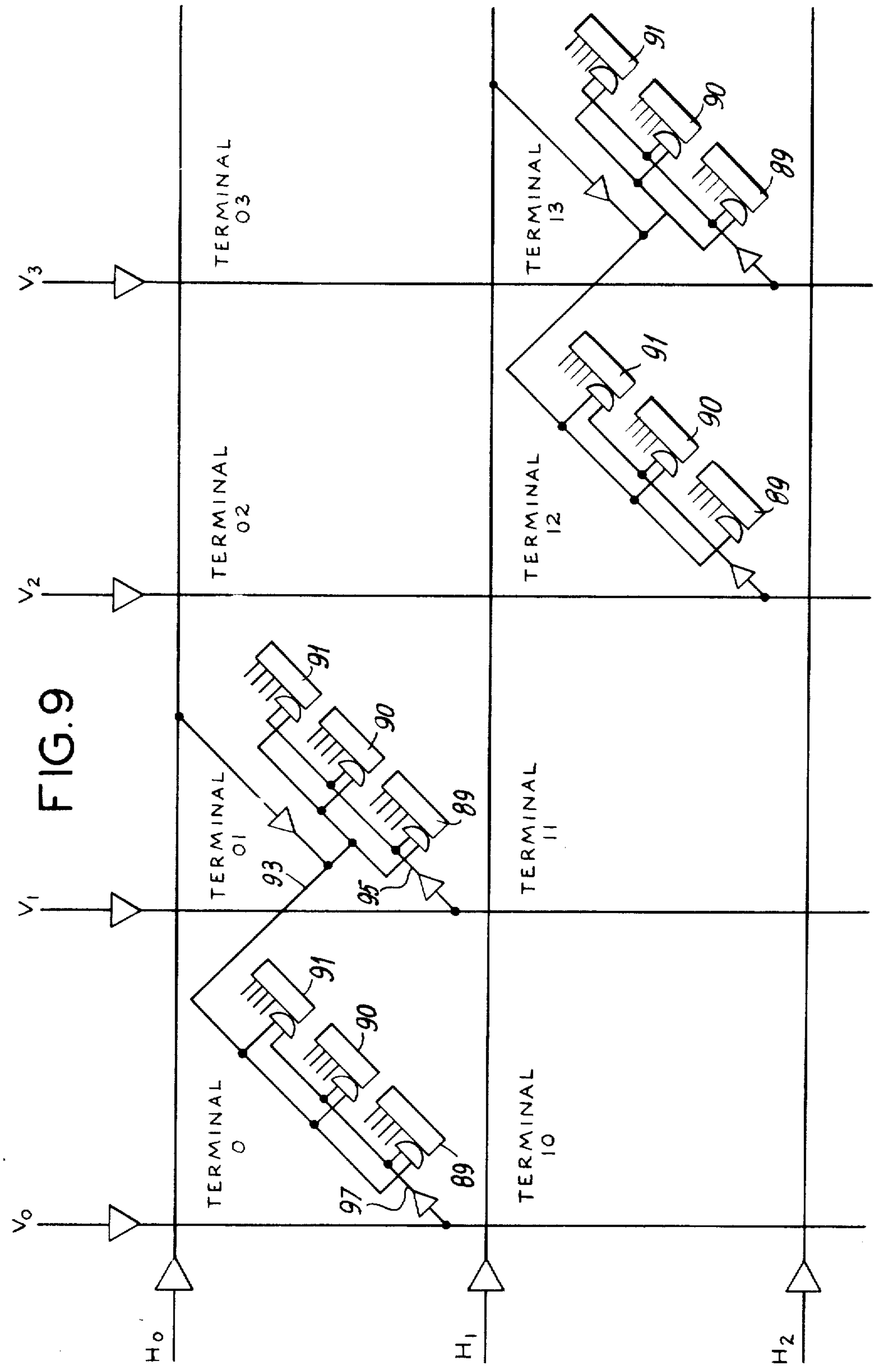
FIG. 9 is a schematic representation of the logic implemented by the electrical circuitry shown in FIGS. 6–8.

The diagram of FIG. 9 represents the matrix logic for connecting selected terminals to a bus. As shown there, a combination of signals on one of the output lines $H_0$–$H_7$ of the "tens" matrix 83 is ANDED with a signal on one of the output lines $V_0$–$V_9$ of the units matrix 84. The latches 89–91 and the conductors 93, 95 and 97 involved in the switching logic for the terminals $T_0$ and $T_1$ are illustrated in FIG. 9. A similar logic is involved for each of the terminals, as may be seen from inspection of the elements illustrated for terminals $T_{12}$ and $T_{13}$. Thus, to bring into play the switching relays for the terminal $T_{13}$, signals are generated on the tens logic line $H_1$ and on the units logic line $V_3$. This results in the energization of those relays for that terminal alone which may have been conditioned by selected bits of the write data bytes Nos. 1 and 2.

The Overall Routing Control Program

In the course of executing any test program, a bit pattern, referred to as a general sequence mask, is generated by the computer whenever the execution of some physical operation is called for by the program. This bit pattern, which is shown in FIG. 10, may be generated bit-by-bit in sequence, or generated simultaneously and scanned in sequence.

Figure 10:
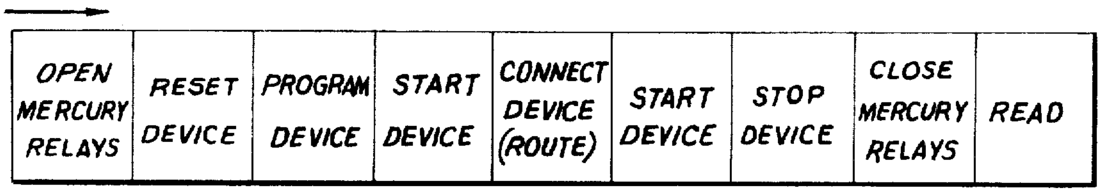
FIG. 10 is a schematic representation of a general sequence of events which may be executed in accordance with a corresponding bit pattern generated by the system computer.

The general sequence mask of FIG. 10 is interrogated in the direction of the arrow from the left-most bit position toward the last bit position on the right. If a 1 appears in any position, the labeled operation is carried out; if instead a 0 is present, that particular operation does not occur and the interrogation advances to the next bit position on the right.

A logic 1 in the first bit position commands the system to open the mercury relays 46 of any devices affected by that command. In general, a mercury relay may be opened when, for example, a particular device is being programmed. By the same token, after a device is programmed, the mercury relays 46 may be again closed and, in this instance, a logic 1 appears in the bit position designated CLOSE MERCURY RELAYS.

Figure 11:
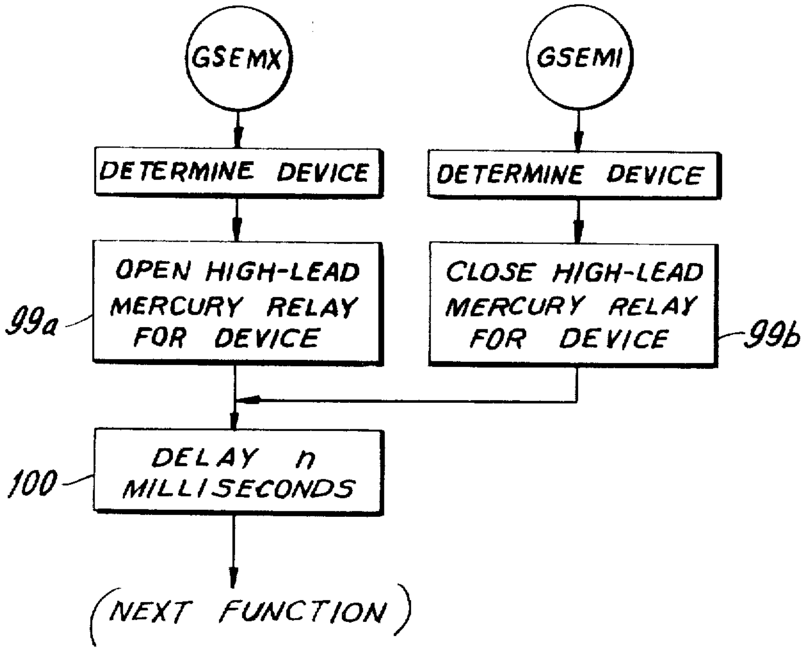
FIGS. 11–20 are flow charts for the routing procedure executed by the apparatus of FIGS. 1 and 2 according to logic programmed into the computer which controls its operation.

FIG. 11 shows the general sequence routines for opening and closing the device high lead mercury relays. A 1 bit in the first position of the general sequence mask calls upon the GSEMX procedure, whereas a 1 in the CLOSE MERCURY RELAYS position directs the system to carry out the GSEMI routine. The device involved is first ascertained in operation 98*a* or 98*b*, whereafter operations 99*a* or 99*b* may be executed. Following either the closing or opening of a mercury relay, operation 100 effecting a delay of *n* milliseconds encompassing the settling time for the relay contacts is programmed, whereupon the machine returns to the object code (i.e., the next command of the routine or sub-routine program) for the next function. In the case at hand, the next function may reside in the general sequence (GSEQ) routine, which continues the interrogation of the GSEQ mask. Thus, one or more of the following operations, aside from operating the mercury relays, might be performed: RESET DEVICE, PROGRAM DEVICE, START DEVICE, ROUTE, START DEVICE, STOP DEVICE, and READ.

The GSEQ mask functions designate, mostly, things to be done by the peripheral devices. Whenever a logic 1 appears in the ROUTE position, the procedure engages the routing routine. It is thus noticed that a device may be started up both before and after routing takes place, depending on the characteristics of the device. The last function is READ which, as the term denotes, commands a device to take a reading or measurement of the terminal(s) to which it may be connected. These functions do not form part of the routing operation but do indicate thepoint in time at which routing takes place in a specified test step.

The ROUTE Procedure

The ROUTE procedure, or routine, is called whenever a 1 is set in the ROUTE location of the GSEQ mask of FIG. 10. A logic 1 there calls upon the system to establish all the circuit connections required to perform a test step or specified connection. The following instruction is an example of a test step which might be specified by the ATLAS program resident in the computer core:

07 VER ACV GT 4.5 VOLTS, PIN 14:12, GOTO 20 IF NOGO $ This statement may be interpreted as: "Step 7, verify an AC voltage greater than 4.5 volts between pins 14 and 12 of the UUT. Advance to Step 8 if the result is verified, otherwise go to Step 20." As applied to routing, this test statement requires that the high lead of an AC digital voltmeter (the multimeter) is to be connected to pin 14 of the UUT, with the low lead of the multimeter connected to pin 12 of the UUT. The multimeter is set automatically by the system to the AC volt mode and the 10 volt scale.

In the flow charts which follow, a distinction is made between terminals connected to devices (device leads) and terminals leading to the unit under test (pins). Thus, certain terminals are connected to device leads, whereas other terminals are connected to pins of the UUT. Although, for convenience, the system will be described in these terms, it is obvious that the logic applies to any two groups of terminals, of whatever number in each group.

Figure 12:
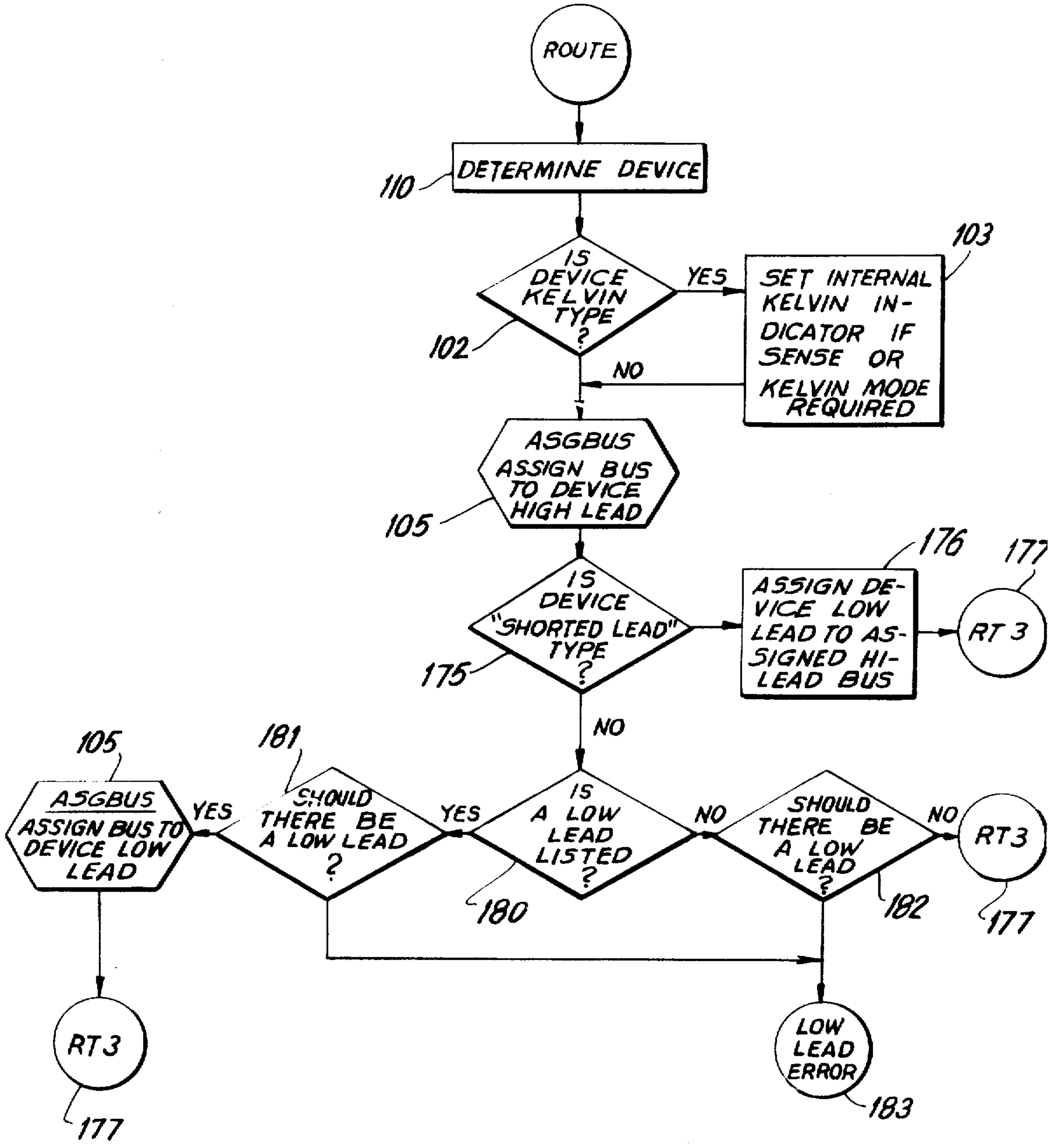

When the ROUTE procedure is called, a number of sub-routines or specific procedures take place. As shown in FIG. 12, one such sub-routine is the "assign bus" (ASGBUS) routine of FIG. 13, which finds and assigns an available bus 25 to the terminal connected to the high lead of the device involved in the test step. In the above example, the bus would be assigned to the terminal wired to the high lead of the multimeter. Following certain decisions, the ASGBUS sub-routine is again called upon to assign a bus to the terminal wired to the other lead (the low lead) of the device.

Figure 15:
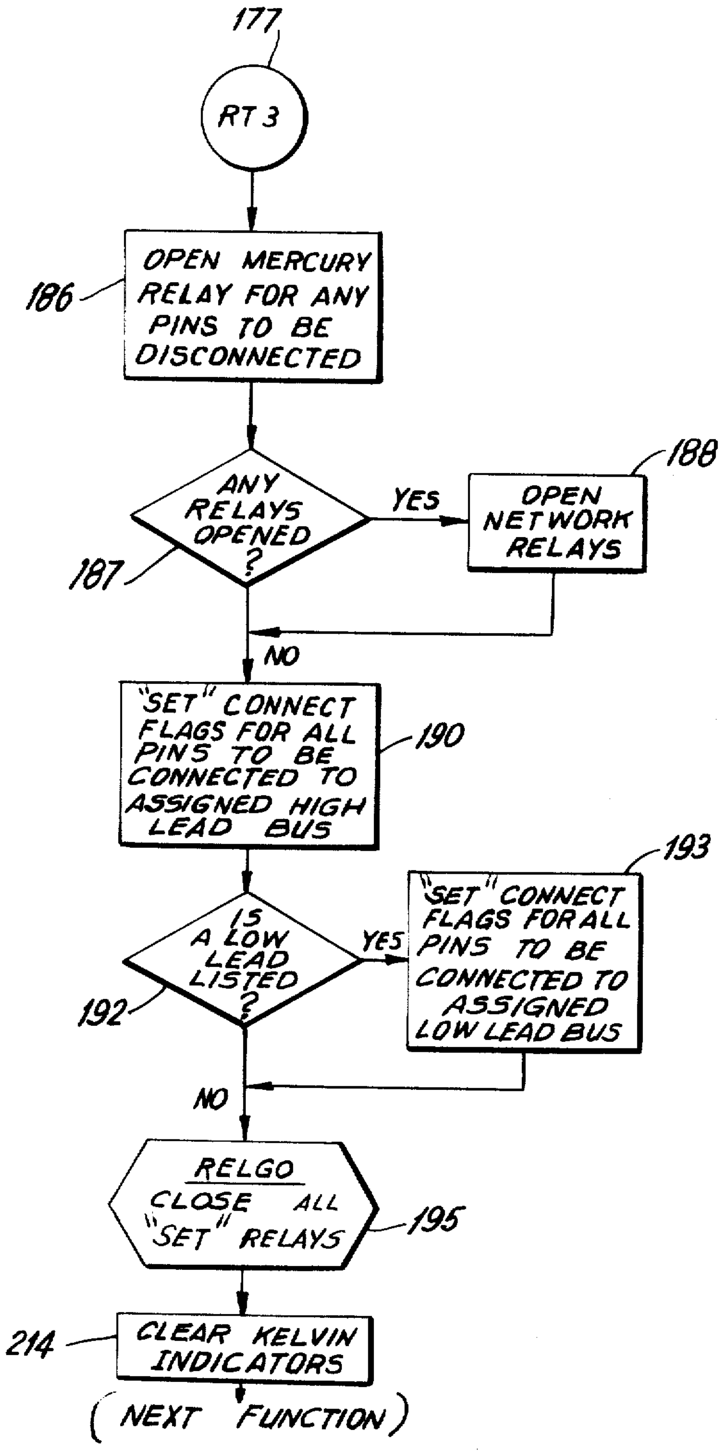
Figure 16:
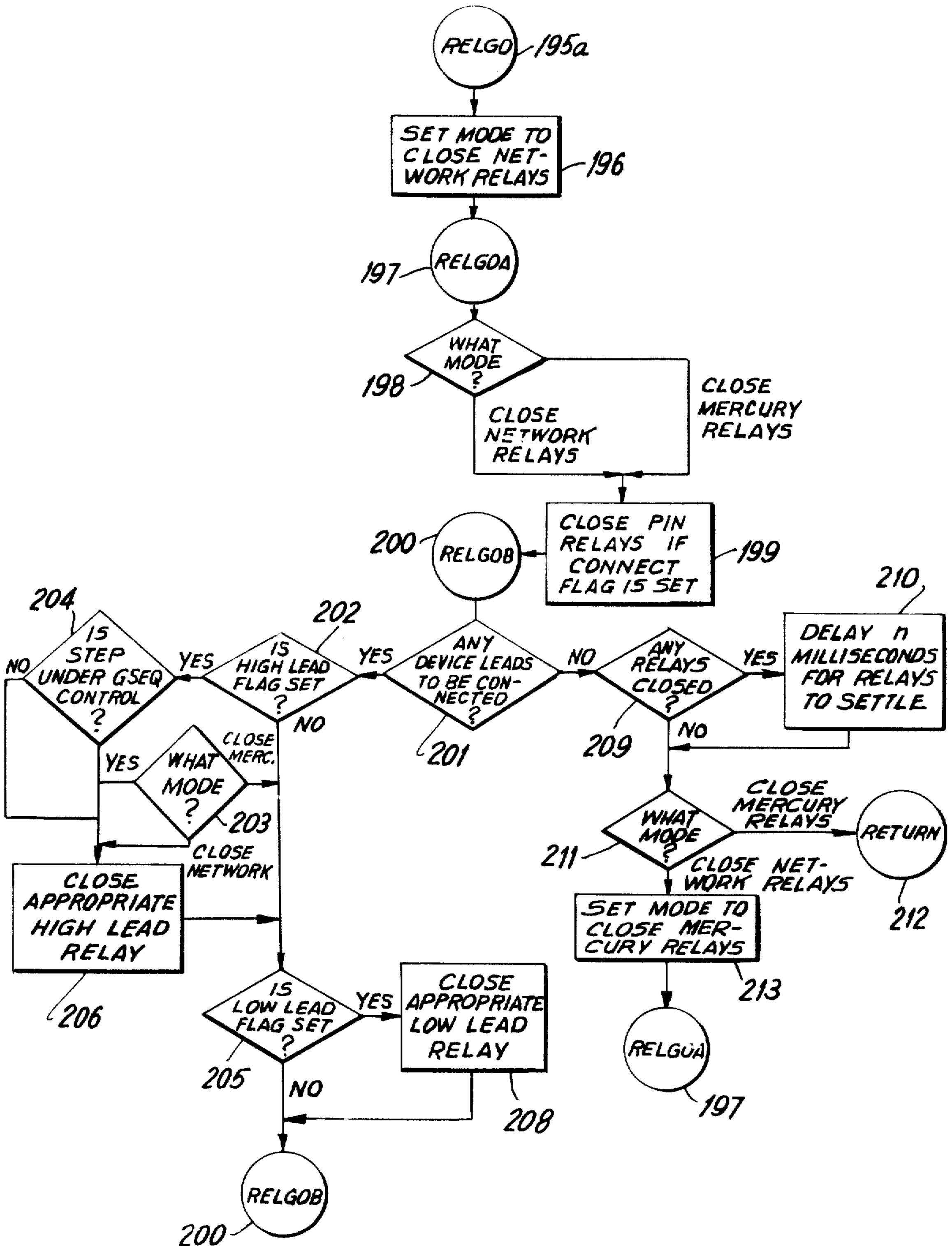

After buses are assigned to the two leads to be connected, there is a call to the routing procedure RT 3 (FIG. 15) which includes, as the final operation enactment of the RELGO sub-routine of FIG. 16. This sub-routine closes all of the relays required to be operated in order to establish the desired connections. The opening of the relays also is accomplished in the RT 3 routine.

When ROUTE is called, the procedure first executes operation 101 to determine the device involved by obtaining its address. In the example given, this would be the address for the multimeter. Next, the procedure advances to decision 102 to determine whether the device is of the Kelvin type, which would require connecting two high device leads to each pin designated in the test. One lead is the normal measurement lead, whereas the other lead is what is commonly referred to as the sense lead. The low lead for a Kelvin device may be grounded, in which case only the two high leads are used, or the low lead may "float" (i.e., be ungrounded), in which case there is also a measurement lead and a sense lead on the low side of the instrument, requiring four terminals and four buses, in all, in order to make a particular measurement with the device.

If the decision 102 indicates that the device is of the Kelvin type, an internal Kelvin indicator is "set" if (a) the sense lead of the Kelvin device is already connected for a Kelvin measurement or (b) the system Kelvin indicator has been activated to designate that the test in progress requires measurement in the Kelvin mode. The Operation 103 thus permits a Kelvin device to remain in the Kelvin mode if it is already operating in that mode (i.e., its sense lead is connected) and thereby avoids additional procedures that would be required to disconnect only the sense lead of the device.

Figure 13:
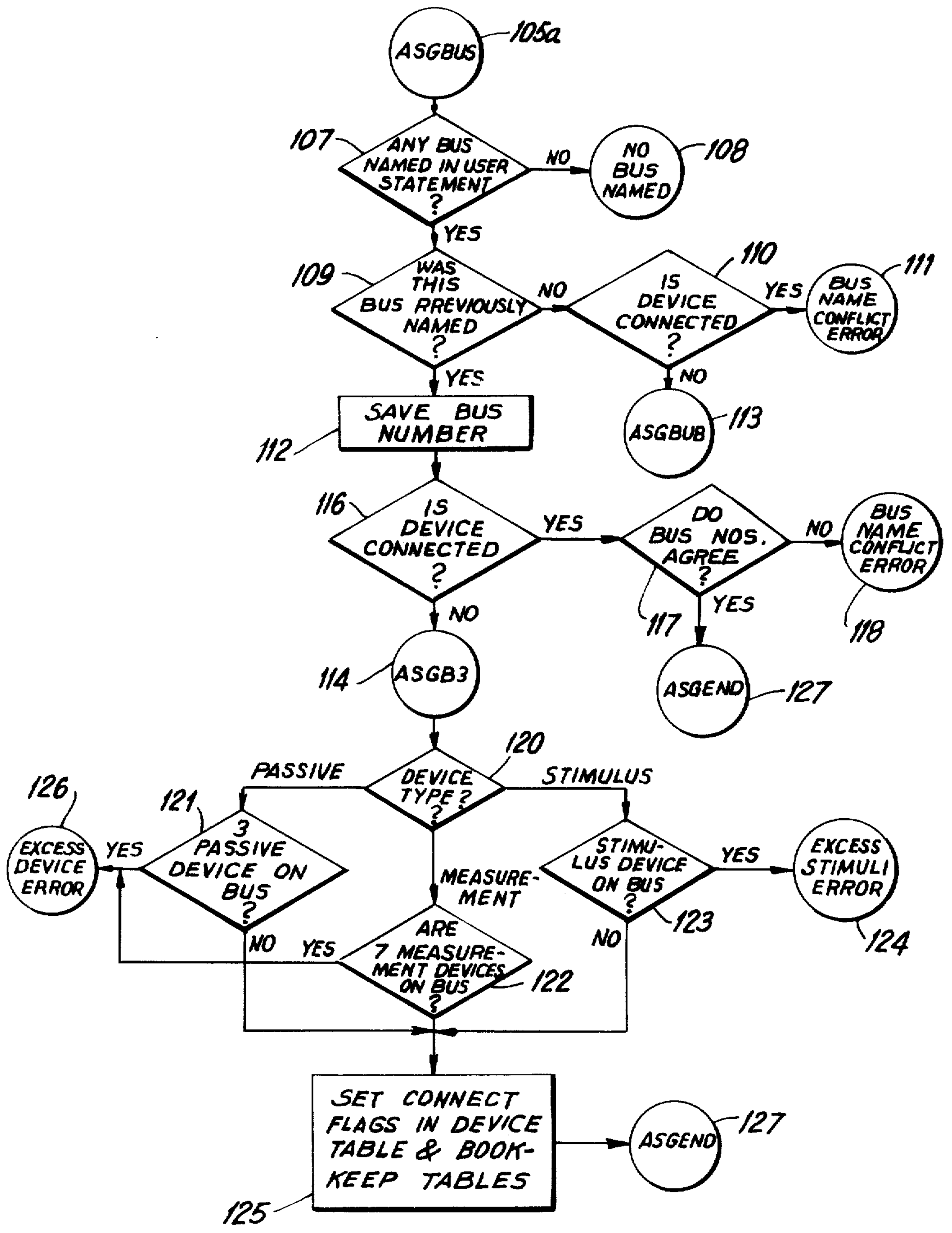

The first steps of the routine thus identify the device to be connected and ascertain whether it should be operated in the Kelvin mode, as this requires additional circuit paths between the device and the UUT. Thereafter, the procedure branches to the ASGBUS sub-routine to assign a bus (or buses) to the device high lead(s). This sub-routine, which is shown in FIG. 13, determines whether a particular circuit path, i.e., a specific bus, is named for the test step and, if so, investigates the validity of the command to make the connection. Specifically, this sub-routine allows executions of a test step connection to a named bus only if the device in question is already connected to that bus or is not connected to any other bus.

Figure 14:
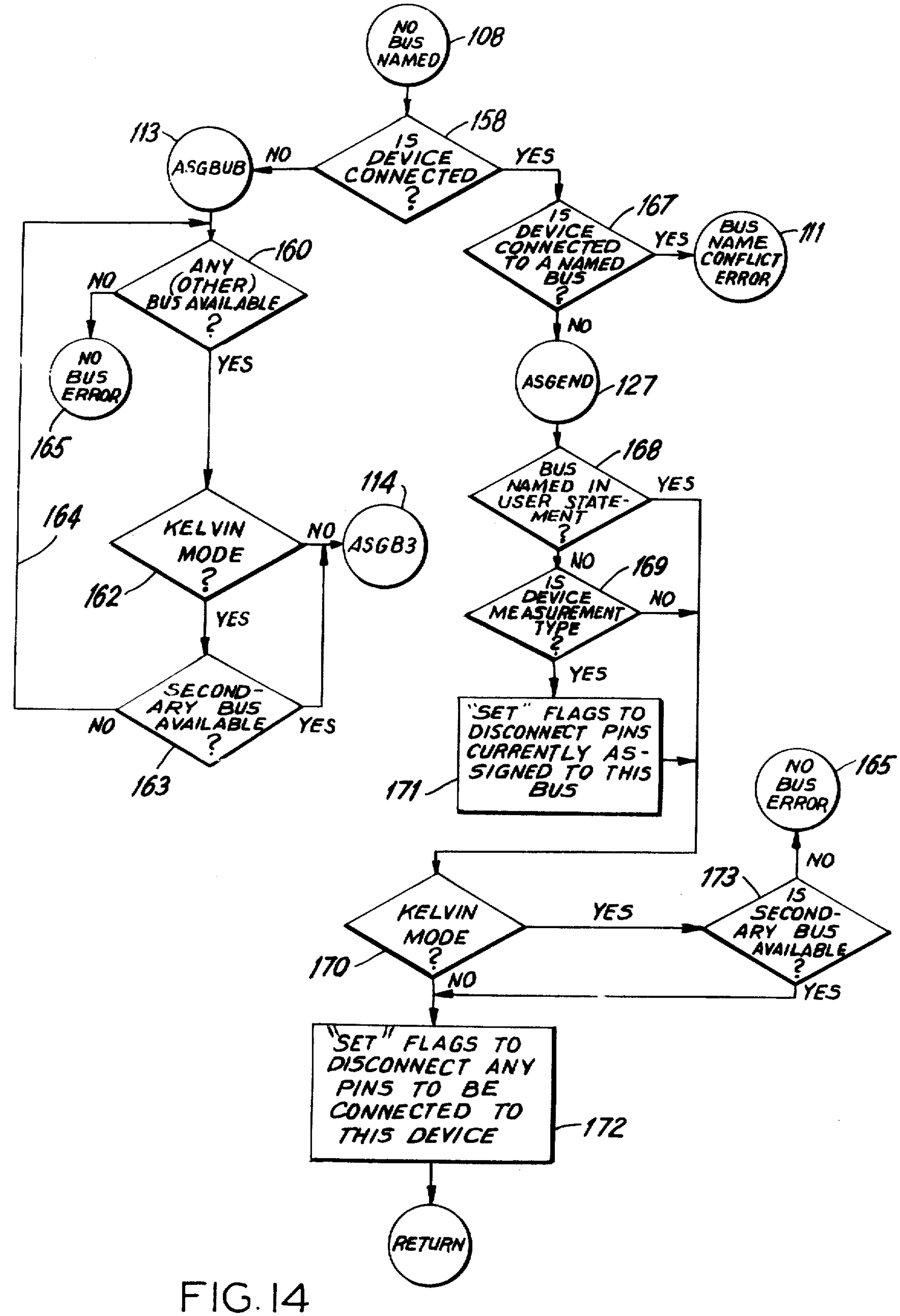

In the event that no particular bus or circuit path is prescribed by the test step, the ASGBUS procedure calls upon the NO BUS NAMED routine shown in FIG. 14.

Referring to FIG. 13, the ASGBUS sub-routine 105 begins with a decision 107, which advises the procedure if a particular circuit (bus) is required to carry out the instruction. If not, and any available bus may be used, the procedure exits at point 108, which is the beginning of the NO BUS NAMED routine of FIG. 14. If, on the other hand, a bus is named in the user test statement, the procedure falls through to the decision 109.

To establish a specific path between a device lead and a UUT pin, it is merely necessary to enter into the program by the operator terminal 11 a statement which designates a bus by an arbitrary symbol. The following are examples of statements involving a named circuit path, or bus:

"21 PROG PSG1 TO 5 VOLTS PINS7, 11 on BUSA $"

"23 VER DCV GT 4.9 LT 5.1 ON BUSA $"

Step 21 programs the programmable signal generator PSG1 to 5 volts and creates a routing path between the generator high output and pins 7 and 11 of the UUT. The software recognizes the statement ON BUSA as an instruction to assign a specific path between the high lead of the generator and the UUT pins. In Step 23, the multimeter is connected to the specific bus which the system found to be available and to which it then assigned the designation A. The multimeter functions then to verify that the voltage on bus A, and therefore the voltage on pins 7 and 11 of the UUT, falls between 4.9 volts and 5.1 volts. The foregoing statements are typical examples, and it is apparent that the system can be programmed to recognize other statements for assigning a specific circuit path between two points.

Returning to FIG. 13, the result of the decision 107 yields a "YES" if a bus is named, so that the decision 109 comes into play. If, as in the case of the first statement in the example above, bus A was not previously named in any test statement, the output of the decision 109 is "NO", advancing the procedure to the decision 110. If the device in question (e.g., PSG1) is already connected to another bus, however, an error 111 results, inasmuch as a device cannot be connected to a bus other than the one to which it is presently connected. Before that device can be reconnected to the named bus, a "DISCONNECT" step must be executed. The procedure executed by the machine in that case is the DISDEV routine shown in FIGS. 17 and 18. If, on the other hand, the device is not connected to a bus, but is unused, the output of the decision 110 is NO and the procedure advances to ASGBUB 113. As will be explained soon, the procedure ASGBUB 113 (FIG. 14) interrogates the bus table (FIG. 21A) to determine the availability of any of the buses. Once a free bus is found, the ASGBUB routine exits to the ASGBUS procedure at the ASGB3 entry point 114.

If the bus named in the present test step named in a previous step, as determined from an examination of the bus table, the system requires that the device be connected to that same physical bus. In operation 112 the bus number of the named bus is saved for future reference and the sequence advances to the decision 116 which ensures connection only to the same physical bus. If, then, the saved bus number ($B_1$–$B_{16}$) agrees with the number of the bus to which the device already is joined, it is not necessary to condition the system to operate any relays for the device lead, and the program jumps to the ASGEND point 127 as a result of the decision 117. If the bus numbers do not agree, however, an error indication is provided at the exit point 118. It may be noted at this juncture that all error indications preferably are used to halt further advancement of the procedure until the source of the error is corrected. Further, error indications may be used to provide a printout at the operator's terminal, or to provide any other desired function.

If the device is not here connected, the procedure comes to the ASGB3 entry point 114, which is also the exit point for the ASGBUB routine briefly reviewed above. At this point in the procedure, an available or named bus is assigned to the device high lead.

A further validity check is made by the decision 120 which consults the device table in the memory core to ascertain the type of device involved. Depending upon the type of device entering into the test step, the procedure next decides whether connection of the device would exceed the predetermined maximum number devices permitted on the assigned bus. The decisions 121 and 122 serve to limit the number of passive and measurement devices connected to a single bus. The decision 123 is a more critical determination that a stimulus device (e.g., signal generator) already is connected to the same bus and, accordingly, signals an error, at point 124. While the existence of more than one stimulus device on the bus need not necessarily be prohibited, an error indication (which could be selectively overridden) is desirable to avoid the possibility of shorting the stimulus device outputs. In this connection, it should be recalled that the ASGBUB routine does not, as a general proposition, preclude the interconnection of plural devices over a named bus.

Once it is determined, from the negative outputs of the decisions 121, 122 and 123 that the number of devices on the assigned bus is not exceeded, the connect flags for the device high lead are set in the device table, and the device count in the bus table is updated to increase by one the existing count stored in that table. Additionally, since connecting bus is now known, an indication of the number of this assigned bus is entered in the device table, manifesting that the terminal to which the device high lead is wired is assigned to that particular bus.

The Table Layouts

Figure 21A:
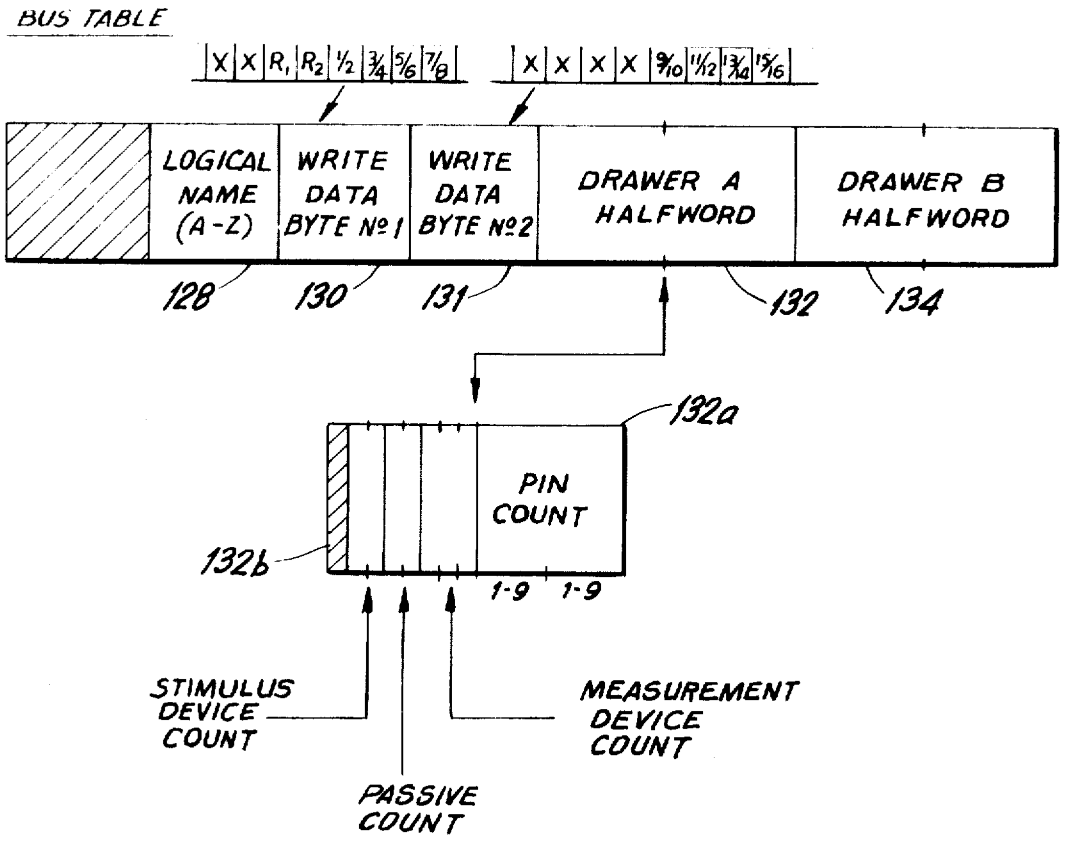
FIGS. 21A–21C are diagrammatic representations of the tables on file contact of the system, as stored in the system memory.
Figure 21C:
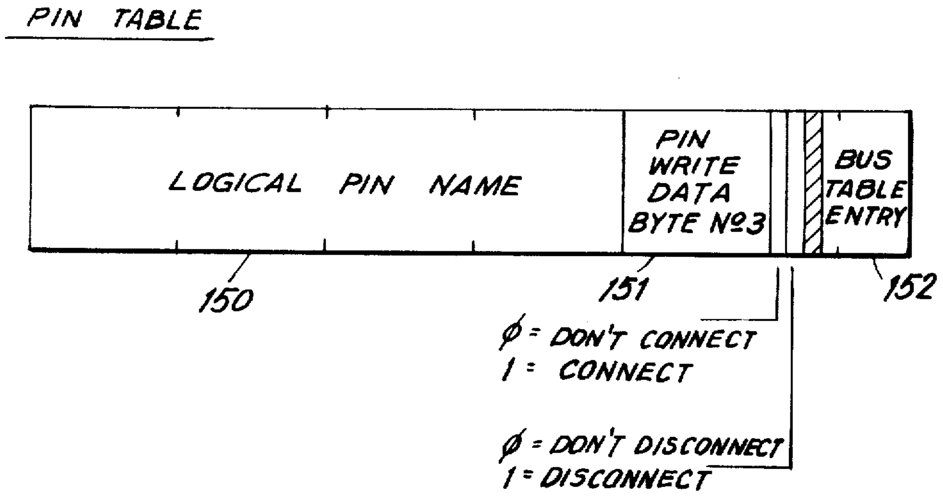
Figure 21B:
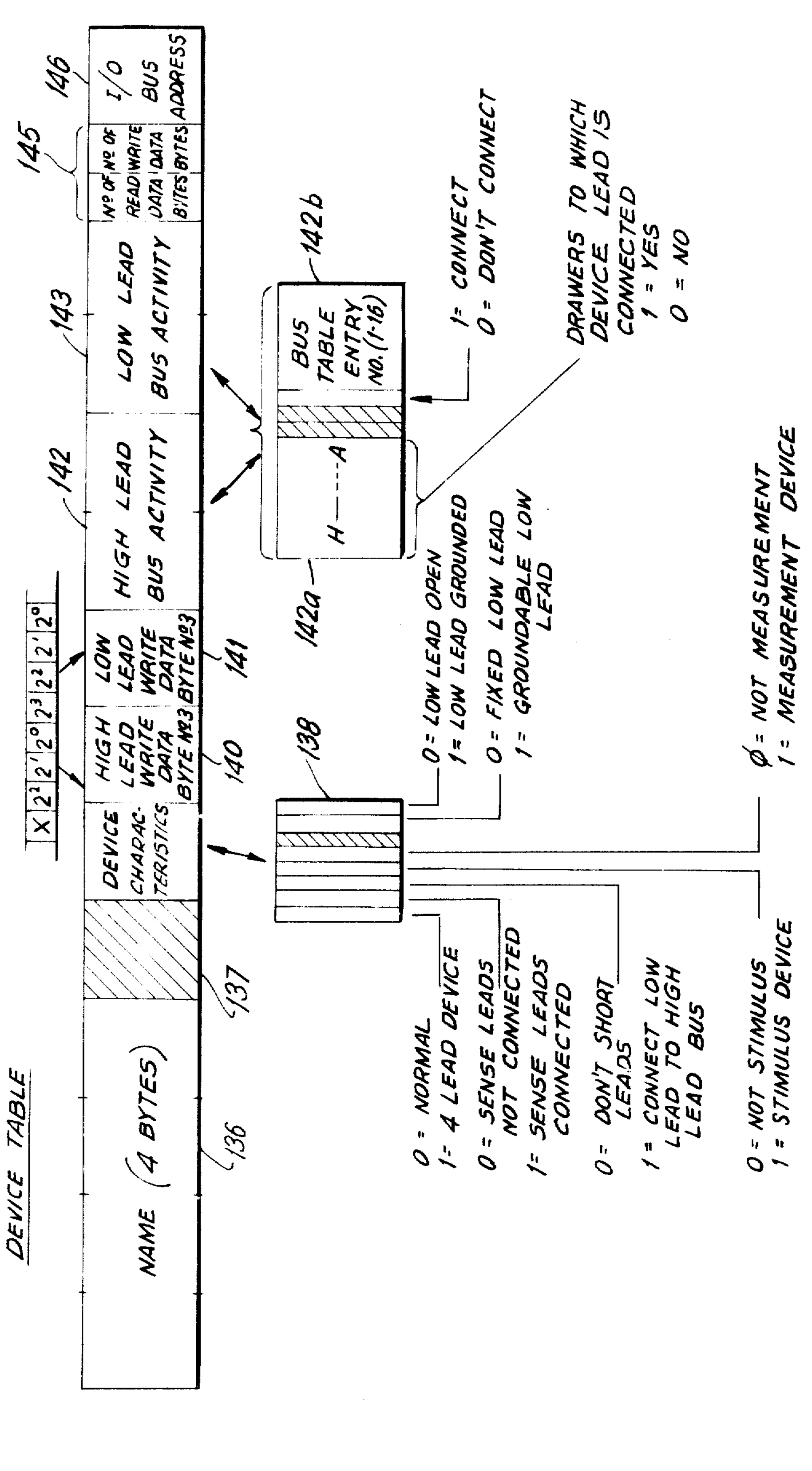

The table layouts for the three primary files used in the ROUTE routine are shown in FIGS. 21A, 21B and 21C. These are, respectively, the bus table, the device table and the UUT pin table.

Referring to FIG. 21A, the bus table is seen to include four major information-bearing areas: A one-byte storage area 128 for containing the logical name for that bus (e.g., the letter names A–Z); a one-byte area 130 for storing the write data byte No. 1 which, it will be recalled, consists of a bit pattern indicating which of the mercury relays $R_1$, $R_2$ is involved and whether the bus is one of buses $B_1$–$B_8$; a similar area 131 for holding the write data byte No. 2 which, similarly, indicates whether that bus is one of the buses $B_9$–$B_{16}$; and an area 132 for containing the "drawer halfword." If more than one switching drawer 48 is employed, an additional drawer halfword area 134 is provided for each other switching drawer in the system. Each drawer halfword contains information regarding the total number of pins connected to the bus, and this information is lodged in the pin count section 132*a* (134*a*) of the bus table, whereas the remaining half 132*b* of the area is dedicated to information of the number of measurement devices, passive devices and stimulus devices then connected to that particular bus.

From the foregoing description of the bus table, it will now be apparent that the operation 125 of the ASGBUS sub-routine "bookkeeps" the bus table by updating the counts contained in the halfwork space 132 reserved in the computer's mass memory.

The device table for a single device is shown in FIG. 21B, the entire device table containing one such entry for each logical test device in the test station. In this connection, it should be observed that the number of entries may be larger than the actual number of physical test devices, inasmuch as devices whose leads may be connected in different modes are repeated in the table. Each entry in the device table is generally 14 bytes in length and includes a first area 136 for storing the defined logical name of the device. For example, although the device may be the third device used with the equipment, it may have been assigned a name by the operator programming a particular test. Thus, device No. 3 might be PSG2 (programmable signal generator No. 2).

The next storage area 137 is reserved for expansion, while the area at 138 holds all information concerning the device characteristics. Each bit position in the area 138 represents a particular characteristic of the device. As illustrated, these bits may signify a Kelvin (four lead) type of device, the connection status of the sense leads of a Kelvin device, the requirement for shorting the high and low device leads by connecting the low lead to the high lead bus, the classification of the device, and the capability of grounding the low lead of the device.

The next two storage positions 140, 141 contain the write data byte No. 3 bit patterns for the device high lead and the device low lead, respectively. These two write data bytes, it will be recalled, provide the terminal address or, in other words, the terminal number $T_0$–$T_{26}$ to which the high and low leads of the device are connected. The next storage area 142 is a halfword unit housing data concerning the bus to which the high lead is (or is to be) connected. The first section of 142*a* includes a 1 in one of the bit positions identifying the switching drawer (if there is more than one) to which the device lead is connected. Information of the particular bus $B_1$–$B_{16}$ assigned to the device lead is contained in the adjoining area 142*b*, together with the connect flag, or bit, for the device lead. A logic 1 in the "connect" location conditions the memory to issue the write data bytes required to connect the device lead to the designated bus upon execution of the test step.

An identical storage area 143 exists for the device low lead and, of course, this lead (unless it is shorted to the high lead bus or unless it is a fixed or grounded type of low lead) will have a different bus table entry than the entry given in the storage sub-section 142*b*.

The other areas in the device table do not enter directly into the routing sequence, in that the area 145 simply gives the number of read data bytes and write data bytes required for the device. The final storage section 146 contains the address of the I/O controller for that particular device. Referring to FIG. 2, for example, this entry would contain the address of a specific device controller for the device in question so that commands can be given to the device itself, if necessary.

FIG. 21C schematically illustrates the other table involved in system routing. This is the pin table and, as will be appreciated, is an abbreviated form of the device table. It is far simpler, in that no information need be contained in this table of any characteristics of a device or the UUT. Each entry in this table is six bytes in length, four of which are reserved for encoded data of the logical pin name assigned by the user. For example, although a particular UUT pin may be connected to terminal $T_{61}$, the user may have defined that pin as PIN61=J103. Accordingly, J103 would be stored in the area 150. The remaining storage areas of the pin table find their counterparts in the device table, as well. One such storage area 151 contains the write data byte No. 3 for that pin. This data byte designates the terminal $T_{26}$–$T_{75}$ to which a particular UUT pin is connected. The address of this terminal could be calculated by the computer from its location in the core. The final entry space 152 in the pin table contains an indication of the bus to which the pin has been assigned, together with indications to either connect or disconnect the pin to or from that bus.

The three tables illustrated in FIGS. 21A–21C represent the system's files by means of which information involving the status of the routing system is continuously at hand and up-to-date.

Determining Bus Availability

Referring now to FIG. 14, it will be recalled that the ASGBUB entry point 113 for the ASGBUS routine is provided when a named bus is to be assigned. This entry point is also reached from the entry point 108 through the decision 158 that the device is not presently connected and no bus is named in the operator's test statement. ASGBUB is thus always called upon to pick an available bus. Under this procedure, a determination 160 is made whether a bus is available. This step involves searching the bus table (FIG. 21A), for a bus entry for which none of the bits for the stimulus, passive or measurement devices is set, indicating that the bus is available for connection to a device.

Since the bus table entries are stored in a known location and sequence, it is possible to search the buses in numerical order, or reverse order. If the device is a stimulus type, the bus table search is conducted in one numerical sequence; if the device is other than a stimulus type, the search is carried out in the reverse sequence. Thus, the bus table might be searched in sequence beginning with the $B_1$ entry for a stimulus lead connection and beginning with the $B_{16}$ entry backwards for a measurement lead connection.

Once a free bus is located, the program can pass through the Kelvin mode decision 162 to the ASGB3 entry point 114, as discussed. A Kelvin connection requires a second bus for the device sense lead and, therefore, the determination 163 must be made to ensure the availability of a secondary bus. Preferably, this additional bus is physically adjacent to the first bus.

An affirmative indication from the determination 163 signifies that a bus is available for both the measurement and sense leads of the Kelvin device, whereupon the connect flags for the device lead relays are set and the bus numbers entered into the appropriate storage area of the device table (142 or 143 in FIG. 21B). If a preferred secondary bus is not available for the sense lead, the procedure is repeated again via path 164 until two suitable buses are found. If, in any event, no single or related pair of buses can be found, as when all of the buses are already connected to devices, the test step cannot be carried out and the routine exits to the point 165 to provide a "NO BUS ERROR" indication.

A device listed by the operator and already connected to an unnamed bus is permitted to remain so connected by the determination 167, which advances the program to the final stage of the ASGBUS sub-routine in such case. This condition is allowed because the procedure of naming a bus overrides some of the general precautionary rules and permits most terminals (pins or leads) to be interconnected over a named bus. Device connections are intentionally preserved so that they will not be broken automatically, but only upon specific command. If a device specified in a test is already connected to a named bus, the routine exits as a bus name conflict error 111. If the device is not connected to a named bus, however, no different assignment need be made because the desired electrical connection is complete in all respects.

Attention may now be directed to disconnecting those unwanted UUT pins still connected to the assigned bus and to readying the specified UUT pins for connection. These functions are achieved in the remaining portion of the ASGBUS sub-routine.

It will be recalled that access to the ASGEND entry point 127 may be gained both in the case of a named bus step and an unnamed bus step. Thus, a decision 168 is repeated to determine whether a bus is named in the operator's test statement. When the operator names a bus for interconnecting terminals, any unused device can be added to the named bus without regard to the existing UUT connections to the bus. In the case of taking a measurement via an unnamed circuit path, however, all existing UUT connections to the bus are broken in order to avoid inadvertent damage to sensitive measuring instruments. This precaution is implemented by the operation 171 following the decision 169, which conditions connected pins for disconnection by setting the "DISCONNECT" flags in the pin table.

After a Kelvin mode validity check in the decisions 170 and 173 to ensure that a secondary bus is available for a device that is already connected in the non-Kelvin mode, all UUT pins which are to enter into the new connection are conditioned for disconnection from any other circuit path by the operation 172 prior to their reconnection to the assigned bus. The ASGBUS sub-routine is now complete, wherein the procedure returns to ROUTE of FIG. 12.

Referring again to FIG. 12, the ASGBUS sub-routine 105 is followed by a determination 175 regarding the type of device involved in the measurement. If it is a device which requires the low lead to be shorted to the high lead, operation 176 is enlisted to assign the device low lead to the already assigned high lead bus. Since no bus is required for the low lead in this case, it is not necessary to travel through the procedure for assigning a different bus to the device low lead. Accordingly, the program branches directly to the procedure RT3 at 177 for operating the relays.

If the device is not a shorted lead type, the flow proceeds from the negative output of the decision 175 to the decision 180, which ascertains the listing of a low lead connection in the user's statement. In the previous examples, a specified low lead connection is recognized through its separation by a colon(:) from the high lead pin listing. Assuming a low lead is specified, flow continues to the determination 181, which inquires whether a low lead should have been specified for that particular step. If the low lead is properly specified, the ASGBUS sub-routine is again enacted, and proceeds through the same decisions and operations performed during assigning of the high lead bus. An incorrect omission of the low lead specification results in a low lead error 183.

If no low lead correction is required and has been correctly omitted from the test statement, the decision 182 sends the process to the relay operation portion RT3 of the ROUTE routine.

At this point in the ROUTE procedure, buses have been assigned to the terminals associated with the high lead and the low lead of the device involved in the test. Moreover, indications that the device leads are connected to particular buses are stored in the device table, and indications also have been stored in the bus table that device leads have been assigned for connection to those particular buses. Also, pursuant to the ASGEND procedure shown in FIG. 14, the flags are set for making any required disconnections of UUT pins from the assigned bus and for making the required disconnections of any pins, presently connected elsewhere, which are to take part in the new connection according to the exsiting ATLAS command.

Opening The Relays

In FIG. 15, the entry point RT 3 at 177 is reached after the system is conditioned for connecting the device leads to the assigned buses and for disconnecting pins which which must be disconnected prior to making the new connection. The sequence which follows is to (1) open the mercury relays for all pin disconnections, (2) open the pin network relays, (3) set the pin relays to be closed, (4) close the pin network relays, (5) close the lead network relays, (6) close the pin mercury relays, and (7) close the device lead mercury relays.

Opening the mercury relays for the pins occurs at 186. In the pin table of FIG. 21C, any pin to be disconnected will have its DISCONNECT flag entered as a logic 1. To open the required mercury relays, the pin table is searched for any pin wherein the disconnect flag is set. When such a pin is located, the number of the bus to which the pin is connected (or the address of the location of the particular bus table entry) is used to gain entry to the bus table (FIG. 21A). In the bus table, the write data byte No. 1 stored in the core area 130 is extracted. If the bus is an odd numbered bus, there will be a 1 in the $R_1$ bit position of write data byte No. 1; if it is an even-numbered bus, a 1 appears in the $R_2$ bit position instead. To open the mercury relay, the write data byte No. 1 is processed to blank out the bit in the mercury relay position before this byte is written as data to the switching drawer device controller (FIG. 6). The bit for the network relays for that pin, however, is retained, so that any network relays are not de-energized prior to opening the mercury relays.

The foregoing procedure is continued until all mercury relays for the pins to be disconnected have been opened. When the search of the pin table has been completed, the operation 186 is ended, and the opening of any mercury relays results in an affirmative decision from 187 commanding that the network relays now be opened. This occurs in operation 188, and involves a similar sequence of events as explained for the mercury relays. Specifically, the pin table is searched again for any pins for which the disconnect flag has been set. Again, entry is gained to the bus table and the write data bytes Nos. 1 and 2 are masked to provide an all-zero pattern to the latches 90, 91 (FIG. 8) for the pin in question. When the bit pattern of the write data byte No. 3, obtained from the pin table, is written to the switching drawer, any closed network relays will be opened. This procedure is continued until a search of the pin table has been completed, at which time the routine advances to the operation 190.

Closing the Relays

By operation 190 (FIG. 15) the connect flags for all pins to be connected to the assigned high lead bus are set. These are the pins specified in the operation's test statement and a 1 is entered in the CONNECT bit position of the pin table for each pin to be connected. Once the connect flags have been set for the high lead bus, it is ascertained at 192 whether a low lead connection has been called in the user's statement. Since the validity of the low lead connection of the test statement has been proved in the ROUTE procedure, the routine can proceed directly to execution of the commands for the low lead pin connections. If a low lead connection is listed, the operation 193 is carried out. This effects the setting of all connect flags for those pins which are to be connected to the assigned low lead bus. The steps involved in this operation are identical to those included in the operation 190, which sets the connect flags for pins to be coupled to the assigned high lead bus.

At this point in the procedure, all required disconnections of the pins have been made by first opening the mercury relays and then opening the network relays. Earlier, the connect flags for the device leads were set, and the system is now ripe for closing all of the "set" relays. This occurs in the RELGO sub-routine 195, the operations of which are depicted in the flow chart of FIG. 16.

The RELGO sub-routine begins at the entry point **195*a* and advances to the first operation 196,** fixing the mode of system operation to close the network relays first. This operation is programmed, as mentioned, so that the network relays are operated with no current flow through the circuit, the mercury relays between the pin or device lead to be connected to the bus being open. The mercury relays are closed only after the network relays have been closed.

Once the mode is set, the sub-routine ascertains, at 198, its present mode, which is either the "close mercury relays" mode or the "close network relays" mode. In either case, the next step 199 in the sub-routine is to close all pin relays for which the connect flag has been set. This operation involves the following actions. Each entry in the pin table (refer to FIG. 21C) is searched for the presence of a "connect" flag. If no such entry is found, the RELGO sub-routine advances to the RELGOB entry point 200. If a "connect" flag is located, however, the bus table number is picked up to gain access to the bus table (FIG. 21A). There, the bit patterns of the write data bytes Nos. 1 and 2 are extracted. If the mode is to close the network relays, the mercury relay bits are masked out. If the mode is to close mercury relays, both the mercury relay bits and the network relay bits are retained in the data bytes addressed to the switching drawer. It should be noted that, if a Kelvin mode measurement is being made, both mercury relay bits are turned on in the "close mercury relay" mode. Next, the write data byte No. 3 from the pin table (FIG. 21C) is extracted (or calculated) and written to the switching drawer. This results in a closure of the appropriate network relays for the pin to be connected.

The foregoing sequence of events is repeated until the entire pin table has been examined, after which the procedure advances through the entry point 200 to the decision 201. If, as is the usual case, there are any device leads to be connected, the decision 202 inquires whether the high lead flag is set. Next a check is made, at 204, to ensure that the connection of the high lead is not under control of the general sequence (GSEQ) routine of FIG. 11, which also controls mercury relay operations. Should the high lead connection fall under GSEQ control, and should the decision 203 indicate that the mode is "close mercury relays," the RELGO sub-routine relinquishes control, and the procedure falls through to the decision 205 for the low lead connection. On the other hand, if the high lead connection is not under GSEQ control, or if the mode is to close the network relays, then the appropriate high lead relay (either the network relay or the mercury relay, depending upon the mode designated by the decisions 198 and 203) is closed.

The closing of the device high lead relay, which occurs in the operation 206, involves steps similar to those required to close the pin relays. The primary difference is that the bus table entry is obtained from the device table rather than the pin table, as is the write data byte No. 3. As in the case of closing the pin relays, the device lead relays are closed by writing the three write data bytes to the routing switching drawer controller, with the appropriate mercury relay bits masked out, depending upon the connection mode.

If a low lead connection operation is signaled by the decision 205, the appropriate low lead relay is closed by the operation 208. If the no low lead flag is set, or following closing of the appropriate low lead relay, the sub-routine recirculates to the RELGOB entry point 200.

An examination of the device table continues until the decision 201 determines that no further device lead network relays need be closed, whereupon the decision 209 is consulted to interpose a predetermined delay 210 following closing of any network relays prior to advancing to the decision 211. This decision ascertains that the system is in the "close network relay" mode and by the operation 213, changes the mode from "close network relays" to "close mercury relays." The sub-routine then recirculates to the RELGOA entry point 197 in order to repeat the necessary actions for closing the mercury relays. This involves the same steps just discussed, except that also the mercury relay bits of the write data bytes are written to the switching drawer controller.

Once the decision 201 determines that all of the device leads have been connected by closure of the mercury relays, steps 209, 210 and 211 are carried out, the final step being a decisional determination that the system is in the "close mercury relays" mode, causing the procedure to exit from the RELGO sub-routine at the exit point 212 and to reach the next operation 214 in the RT–3 routing of FIG. 15.

The operation 214 is, essentially, the final operation in the establishment of an electrical circuit between two or more terminals. This effects the clearing of all Kelvin indicators including the internal Kelvin indicator set by the operation 103 (FIG. 12). Generally, the automated test apparatus at this point proceeds to control an operation of the device employed in the particular test step. Thus, the apparatus may return to complete scanning of the general sequence mask of FIG. 10.

Disconnecting Devices

In addition to making automatic disconnections in the process of interconnecting devices and UUT pins, commands may be issued to the system to disconnect a device. It will be recalled that a terminal to which a device lead is connected may be disconnected from a bus upon a specific command to "disconnect." Unless an instruction is made to remove a device, it remains connected to the bus which was assigned to the device lead. Disconnecting a device basically involves first opening the mercury relays for the device high and low leads and then opening the network relays for the device high and low leads. If the device is the last device connected to a bus, any UUT pins connected to that bus are also automatically removed, inasmuch as they serve no purpose thereafter.

Figures 17, 18:
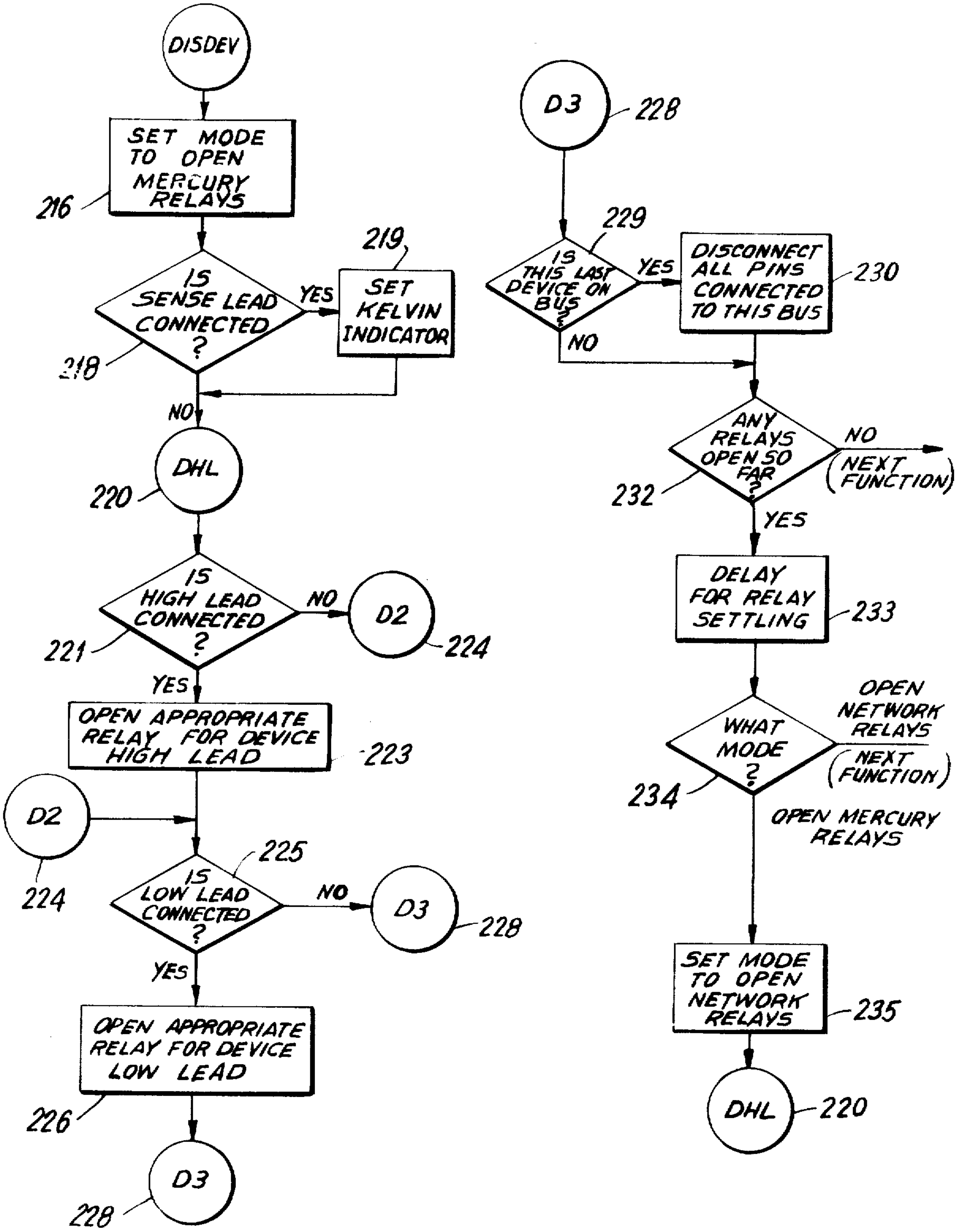
Figure 19:
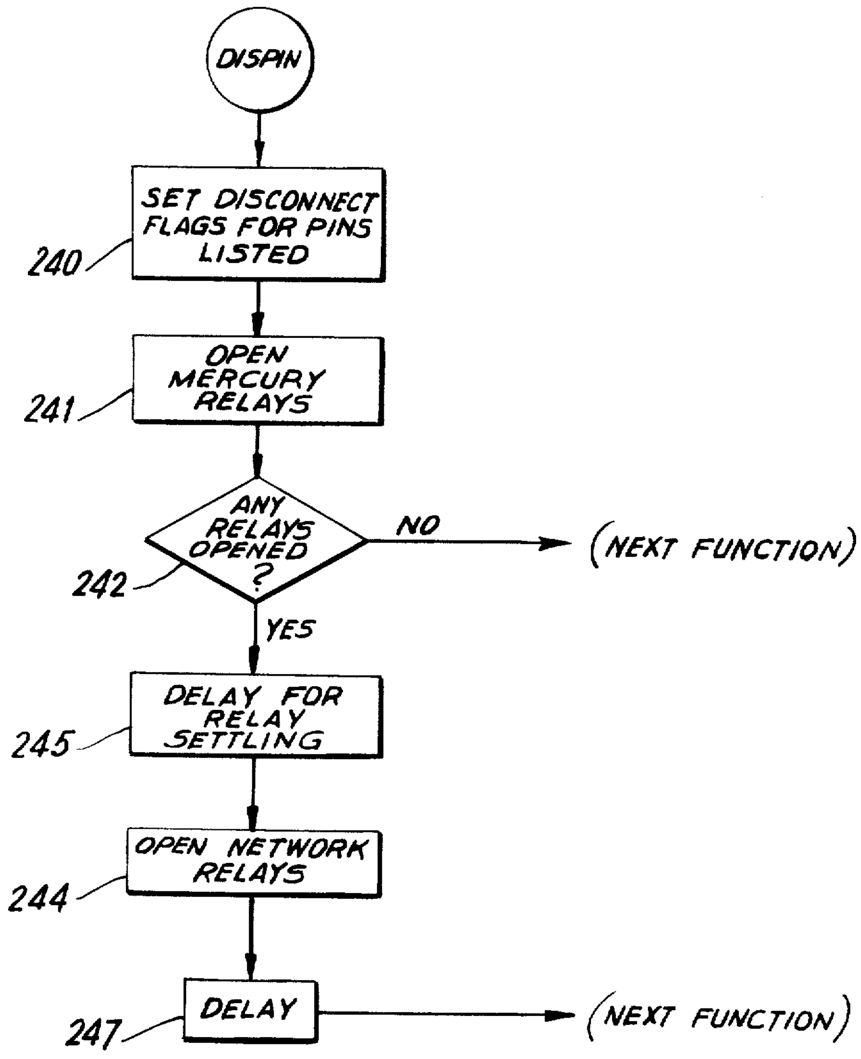

The disconnect device (DISDEV) routine appears in FIGS. 17 and 18. The first operation 216 involved in this routine is to set the mode to open the mercury relays associated with the device. If the decision 218 determines (from the device table) that the sense lead for the device is connected, the internal Kelvin indicator is set at 219 before the routine falls through the DHL entry point 220 to the next decision 221, which ascertains the connection status of the device high lead. The mercury relay for any connected device lead is opened if the routine is in the "open mercury relays" mode. If the device high lead is not connected, the operation 223 is avoided by passing directly to the D2 entry point 224.

Next, the low lead status is determined at 225, and if this lead is connected, the mercury relay is opened by the operation 226. The program bypasses the operation 226 and proceeds to the D3 entry point 228 if no low lead disconnections are required. This brings the procedure to the flow chart of FIG. 18. The operations 223 and 226 involve writing 0's to the switching drawer for the mercury and network relays associated with the device to be disconnected. When the third write data byte for that lead arrives, the latches are conditioned for opening all relays to which 0's were written.

Before proceeding further, it is first determined at the decision 229 whether the device is the last device on the bus. This can be ascertained from the storage location **132*b* of the bus table (FIG. 21A). As before, entry to the bus table is obtained from the information contained in storage areas 142 and 143 of the device table (FIG. 21B). In the operation 230, all pins then connected to the bus in question are disconnected if the device being disconnected is the last device on that bus. It will be appreciated that the operation 230 may involve the same disconnection steps that have been previously explained in connection with the ROUTE routine. Thus, the pin table (FIG. 21C**) may be searched for any pins connected to the specific bus, the "disconnect" flags set for each of the pins found, and then writing the three write data bytes to the switching drawer to open the mercury relay connecting that pin to the bus.

The DISDEV routine now merges with the negative output of the decision 229 and advances to a decision 232, which causes the procedure to exit to the object code for the next function unless any mercury relays were opened. If so, a delay 233 is interposed if any relays were opened and, provided the mode is determined at 234 to have been "open mercury relays,"the mode is changed to "open network relays" at 235 before returning to the DHL entry point 220 in FIG. 17. The process is then repeated for the network relays and, upon reaching the decision 232 (FIG. 18), the routine either returns to the object code for the next function in the test program or interjects the delay 233 and then exits from the decision 234.

Disconnecting UUT Pins

A similar disconnection procedure exists for the UUT pins. This is the "DISPIN" shown in FIG. 19. When this routine is called by an instruction to disconnect certain pins, the disconnect flags for the pins in question are set at operation 240, whereupon the mercury relays first are opened and, if the decision 242 determines that any relays were opened, the routine advances to the operation 244 for opening the network relays after allowing a delay at 245 for mercury relay settling. Following this, delay 247 is introduced for network relay settling, completing the DISPIN routine. It may be noted that the operations 241 and 244 for opening the mercury and network relays are essentially identical to the operations 186, 188 of the RT3 procedure of FIG. 15.

Powers and Loads

Figure 20:
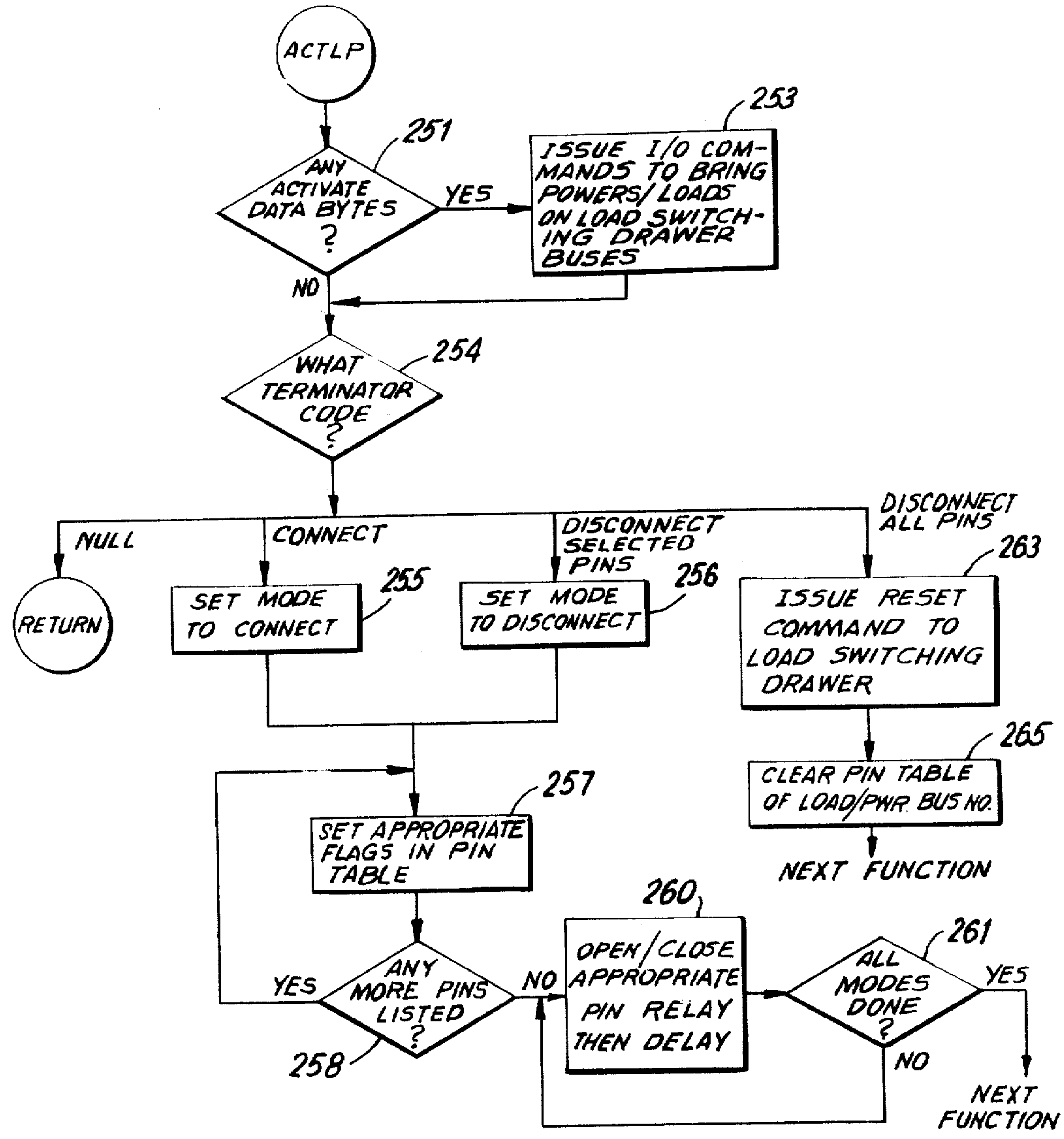

Whenever an instruction is received to connect a power (e.g., a fixed, direct current voltage or a ground) or load (such as a resistance) to a pin or pins of the UUT, an "activate data byte" is issued and detected by the decision 251 in FIG. 20. The presence of any such byte causes the issuance of an input/output command to a separate load switching drawer 29 (FIG. 2) to connect, via at least one switch, the appropriate power or load to a predetermined bus within that drawer. The load switching drawer is similar to the routing switching drawer (FIGS. 3 and 5) in physical appearance and electrical arrangement. The function of this drawer, however, is simply to connect a selected device to a specific bus internal to the load switching drawer. No determination of bus availability is made in this case, inasmuch as these internal buses are dedicated to specific external equipment. As a result of issuing I/O commands, therefore, a load or power supply unit is connected by the operation 253 to one of the buses within the load switching drawer.

All commands to the load switching drawer pass through a separate device controller 30 (FIG. 2) for that drawer. It is thus treated as a single device capable of providing no more signals or loads than there are buses within the switching drawer. The load switching drawer provides a number of output terminals which are connected to the UUT Pin and receptacle. Thus, the output terminals of the load switching drawer are connected to at least some of the same UUT pin terminals as are the terminals from the signal routing drawer 48, discussed above. Also, the functioning of the relays and their control may be identical to that already described there. To bring in a power or load connected to one of the buses internal to the load switching drawer, the load switching drawer, the load switching drawer is addressed rather than the routing switching drawer so that a power or load is applied to the UUT pin or pins in question, rather than to one of the 16 routing buses $B_1$ $-B_{16}$.

Turning again to FIG. 20, once all desired loads and powers have been switched onto the appropriate buses within the drawer 29, it is next determined at 254 what terminator code is applicable, i.e., what terminating procedure is required. A "null" will be generated if none of the loads and powers is to be connected to any UUT pins at that point in the test. The program returns to the next function in such case. If the terminator code indicates that certain UUT pins are to be connected or disconnected, the appropriate mode is set at 255 or 256. Depending on the mode, the appropriate flag for each pin to be disconnected from or joined to a load or power is set in operation 257. This procedure continues until the appropriate flag has been set for each pin affected, as determined by the decision 258.

As each connect flag is set, the number of the dedicated bus within the load switching drawer is entered in the pin table. Operation of the relays to connect the selected UUT pin to a load or power is carried out in the step 260. This involves use of the bus table entry in the pin table to obtain access to the bus table, where the write data bytes (Nos. 1 and 2) are extracted and addressed to the load switching drawer, followed by the write data byte No. 3 calculated from the pin table. It is noted that, in the case of the load switching drawer, the bus table is used only to provide the appropriate data byte bit pattern to close the appropriate mercury and network relays for the load switching drawer. Signal routing is not effected.

As before, the first relays to be closed and the last relays to be opened are the network relays. Thereafter, the decision 261 ascertains whether both the network and mercury relay operation modes have been completed; if not, the operation 260 is again performed for the remaining mode. When all modes are completed, the program returns for the next function.

Another terminator code also is possible in connection with the loads and powers. This is the "disconnect all pins" code for taking off all loads and powers from the UUT. To accomplish this function, the load switching drawer is addressed and a "system clear" (SCLR) command is issued. This function occurs in the operation 263 and is followed by the clearing of all load/powers entry information in the pin table in the operation 265.

We claim:

1. In a system for automatically testing units having electrical circuits by exciting the unit under test with a stimulus device and obtaining an indication of the unit's response thereto by at least one measurement device and wherein the unit has a plurality of terminals, the improvement comprising means for connecting selected unit terminals to at least one device terminal, including:

input means for generating programmable command signals;

a plurality of buses over which signals to and from unit terminals may be transmitted;

a memory for storing electrical indications of existing terminal connections made via said buses;

switch means associated with the unit terminals and controllably operable to individually connect unit terminals to each of the plurality of buses;

switch means associated with the device terminals and controllably operable to connect at least said one device terminal to at least one bus;

control means responsive to said command signals including means for interrogating the memory storing said indications of existing connections of terminals to the buses to locate a bus to which no predetermined terminal connection is made and which thereby is available for connection to the terminals to be interconnected;

means responsive to said interrogation for storing in the memory an indication that a terminal connection is to be made to said bus determined from said interrogation to be available, and means for generating switch control signals; and means for coupling the control means to the respective switch means so as to operate the switch means associated with the available bus in response to the switch control signals.

2. The system of claim 1, wherein the control means further includes:

means for interrogating the memory for the existence of any connection, other than a predetermined connection, between the available bus and terminals other than those terminals desired to be interconnected; and means for generating signals to operate the switch means associated with such other terminals to cause their disconnection from said bus prior to operation of the switch means to make the connection with the desired terminals.

3. The system of claim 1, wherein the control means further includes:

means for interrogating the memory for the existence of any connections between the desired terminals and any bus other than the available bus; and means for generating signals to operate the switch means associated with such connected desired terminals to cause their disconnection from the other bus prior to operation of the switch means for connecting the desired terminals to the available bus.

4. The system of claim 1, wherein;

the input means selectively generates command signals for storing in the memory a designation representing a particular bus for use in an interconnection; and the control means further includes means for interrogating the memory for stored indications of any connection of the predesignated bus to a terminal other than a terminal to be interconnected, or (b) a desired terminal to a different bus, and means responsive to detection of such a stored indication to preclude the generation of switch-control signals for the attempted interconnection if either such connection exists.

5. The automatic testing system of claim 1, wherein the control means further includes:

means for generating separate indications for different types of device terminals for storage in the memory; and means for detecting from such stored indications whether a device terminal to be connected to a unit terminal is a stimulus type or measurement type device, the interrogating means being responsive to detection of such stored indications so as to interrogate the memory for possible indications of connections associated with one group of buses in determining the availability of a bus for connection to a stimulus type device terminal, and so as to interrogate the memory for possible indications of connections to another group of buses in determining the availability of a bus for connection to a measurement type device terminal.

6. The automatic testing system of claim 5, wherein the interrogating means:

interrogates the memory containing possible indications of connections to the remaining group of buses in determining the availability of a bus if all buses of the first bus group are unavailable.

7. The automatic testing system of claim 5, wherein the interrogating means:

interrogates the memory so as to determine the availability of buses of the respective groups in a preselected order of preference.

8. The automatic testing system of claim 7 wherein the interrogating means:

interrogates the memory so as to select a bus from the remaining group of buses if all buses of the first group to be used are unavailable, such selection occurring in a preselected order of preference that is the inverse of the preselected order of preference for that group when it contains the selected bus.

9. The automatic testing system of claim 1, wherein the switch means for each terminal comprises:

a common node;

a first controllable switch device connected between the terminal and the node; and a separately controllable second switch device connected between the common node and each bus.

10. The automatic testing system of claim 9, wherein:

the generating means is operative to generate switch control signals during a disconnection so as to first operate the first switch device and then operate the second switch device.

11. The signal routing system of claim 9, wherein:

the generating means is operative to generate switch control signals during a connection so as to first operate the second switch device for the available bus and then operate the first switch device for that terminal.

12. The automatic testing system of claim 1, wherein:

the system further comprises means for generating programmable commands to disconnect selected terminals; and the interrogating means includes means operable in response to a disconnection command to interrogate the memory for stored indications of any connection to an available bus of a terminal other than a terminal desired to be disconnected; and the generating means includes means for generating signals operative to disconnect the switch means associated with each such other terminal from said available bus upon disconnection of the interconnected terminal therefrom.

13. The automatic testing system of claim 1, wherein the:

the interrogating means is responsive to indications in the memory representing a predetermined number of terminal connections to at least one bus and provides an indication thereof effective to preclude further connections thereto.

14. The automatic testing system of claim 1, wherein:

the input means selectably generates disconnection commands; and the interrogating means in response to disconnection commands interrogates the memory for indications representing connections between the terminals of first and second preselected groups of terminals, and the generating means generates switch control signals so as to disconnect any terminal of the second group connected to a bus upon disconnection of a terminal of the first group from the same bus.

15. The automatic testing system of claim 1, wherein:

at least one device may be connected to a unit terminal by more than one circuit path in response to a command by the input means;

the memory contains stored indications identifying such device;

the control means further includes means responsive to a device connection command for interrogating the memory for the existence of said identifying indication; and means jointly responsive to detection of said identifying indications and to said connection command for precluding the generation of switch control signals by the generating means if the connection command does not include instructions to connect said device by more than one circuit path.

16. The automatic testing system of claim 1, wherein:

the input means selectively generates command signals for storing in the memory a designation representing a particular bus for use in an interconnection; and the interrogating means interrogates the memory to provide an indication if the particular bus was not previously designated and the terminal to be connected in response to the existing command is connected to a different bus.

17. The automatic testing system of claim 1, wherein the control means includes:

means for determining whether an existing command includes an instruction to connect a device terminal to a unit terminal via a particular bus; and means responsive to said determining means for interrogating the memory for the presence of any existing connections of the terminals of the device to that particular bus and for providing an indication if such existing connections equal a predetermined number.

18. The automatic testing system of claim 1, wherein:

the generating means in response to a command signal generates plural signals for operating the switch means associated with the device terminal to connect respective plural devices to the available bus.

19. The automatic testing system of claim 18, wherein:

at least one of said plural devices is a stimulus device and another of said plural devices is a measurement device.

20. The automatic testing system of claim 18, wherein:

said plural devices are measurement devices.

21. The automatic testing system of claim 1, wherein:

the generating means in response to a command signal generates plural signals for operating the switch means associated with respective unit terminals so as to connect plural unit terminals to the available bus.

22. The automatic testing system of claim 1, comprising:

a source code memory accessible by said input means for storing source code signals representing a programmable command for interconnecting the selected terminals;

memory means associated with said control for storing a set of executable code signals representing at least one predesignated routine which includes the interrogation and indication storing functions of the control means; and means for converting the stored source code signals into a hybrid signal code, and for storing said hybrid signal code in one of said memory means for execution when interconnecting the selected terminals;

said hybrid signal code comprising (1) a call to said executable code signals representing the predesignated routine and (2) relevant source code signal information of the selected terminals to be interconnected, said switch control generating means being jointly responsive to the stored executable signal code and to said stored record of existing connections during execution of the programmed command for generating switch control signals addressed to operate the switch means associated with said available bus.

* * * * *